(12) United States Patent
Qian et al.

(10) Patent No.: US 11,307,653 B1
(45) Date of Patent: Apr. 19, 2022

(54) USER INPUT AND INTERFACE DESIGN IN AUGMENTED REALITY FOR USE IN SURGICAL SETTINGS

(71) Applicant: MediVis, Inc., New York, NY (US)

(72) Inventors: Long Qian, Brooklyn, NY (US); Wenbo Lan, Brooklyn, NY (US); Christopher Morley, New York, NY (US)

(73) Assignee: Medivis, Inc., New York, NY (US)

( * ) Notice: Subject to any disclaimer, the term of this patent is extended or adjusted under 35 U.S.C. 154(b) by 0 days.

(21) Appl. No.: 17/194,191

(22) Filed: Mar. 5, 2021

(51) Int. Cl.
*G06T 19/00* (2011.01)
*G06F 3/01* (2006.01)
*G06T 19/20* (2011.01)

(52) U.S. Cl.
CPC .............. *G06F 3/011* (2013.01); *G06F 3/017* (2013.01); *G06T 19/006* (2013.01); *G06T 19/20* (2013.01); *G06T 2210/41* (2013.01); *G06T 2219/2012* (2013.01)

(58) Field of Classification Search
None
See application file for complete search history.

(56) References Cited

U.S. PATENT DOCUMENTS

| 10,872,460 B1* | 12/2020 | Luo .................. G06T 19/006 |
| 2020/0054398 A1* | 2/2020 | Kovtun ............... G16H 40/67 |
| 2021/0166486 A1* | 6/2021 | Kim .................. G06T 7/50 |

* cited by examiner

Primary Examiner — Nicholas R Wilson
(74) Attorney, Agent, or Firm — Cognition IP, P.C.; Edward Steakley; Rajesh Fotedar

(57) ABSTRACT

Various embodiments of an apparatus, methods, systems and computer program products described herein are directed to an Interaction Engine. According to various embodiments, the Interaction Engine generates within a unified three-dimensional (3D) coordinate space: (i) a virtual 3D model container; (ii) a virtual 3D medical model positioned according to a model pose within the virtual 3D model container; and (iii) a virtual 3D representation of at least a portion of at least one of a user's hands. The Interaction Engine renders an Augmented Reality (AR) display that includes concurrent display of the virtual 3D medical model container, the virtual 3D medical model and the virtual 3D representation of the user's hands. The Interaction Engine detects one or more physical gestures associated with the user and one or more types of virtual interacts associated with a detected physical gesture(s).

20 Claims, 18 Drawing Sheets

USER INPUT AND INTERFACE DESIGN IN AUGMENTED REALITY FOR USE IN SURGICAL SETTINGS

BACKGROUND

Conventional systems provide for the rendering of virtual reality and augmented reality environments. Such environments provide a visualization of various portions of the physical world as well as simulations of certain events that will or may occur in the physical world. These conventional systems include communication with input devices controlled by one or more users. The input devices allow the users to select certain types of actions and activities within the rendered environments. In many cases, these environments rendered by conventional systems may be specific to certain types of industries. For example, some conventional virtual reality environments may be used to simulate training situations for a type of worker with duties specific to an occupation. In another example, some conventional virtual reality environments may be used to model future events and visualize the occurrence and effects of the modeled future events on a particular physical geographical location.

SUMMARY

Conventional systems for three-dimensional (3D) visualization lack a certain types of functionalities that allow a user(s) to interact and manipulate rendered objects by physical gestures. Various embodiments of the Interaction Engine described herein provide significant improvements of the limitations of conventional systems by providing and implementing various types of virtual interactions. The Interaction Engine tracks a user's movements in the physical world and represents such movements as virtual interactions rendered within a unified 3D coordinate space. Such virtual interactions may result in movement and manipulation of rendered objects in a 3D display. Such virtual interactions may further result in changes to display positions of the rendered objects that trigger portrayal in the 3D display of different types of visual data.

Various embodiments of an apparatus, methods, systems and computer program products described herein are directed to an Interaction Engine. According to various embodiments, the Interaction Engine generates one or more 3D objects within a unified 3D coordinate space, such as: (i) a virtual 3D model container; (ii) a virtual 3D medical model positioned according to a model pose within the virtual 3D model container; and (iii) a virtual 3D representation of at least a portion of at least one of a user's hands. The Interaction Engine renders an Augmented Reality (AR) display that includes concurrent display of the virtual 3D medical model container, the virtual 3D medical model and the virtual 3D representation of the user's hands. The Interaction Engine detects one or more physical gestures associated with the user, such as for example one or more physical movements of the user's hands. The Interaction Engine identifies at least one virtual interaction associated with the detected physical gestures. The Interaction Engine modifies the AR display according to the identified virtual interaction.

According to various embodiments, the Interaction Engine may implement a selection virtual interaction, a zoom-in virtual interaction, a zoom-out virtual interaction and a rotation virtual interaction.

According to various embodiments, the Interaction Engine may implement a windowing virtual interaction, a tap-to-place virtual interaction and a clipping plane virtual interaction.

According to various embodiments, the Interaction Engine may implement a multi-axis cropping virtual interaction, a slice-scroll bar virtual interaction and parameter tuning virtual interaction.

According to various embodiments, the Interaction Engine may implement a scout virtual interaction, an annotation virtual interaction and a reset virtual interaction.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
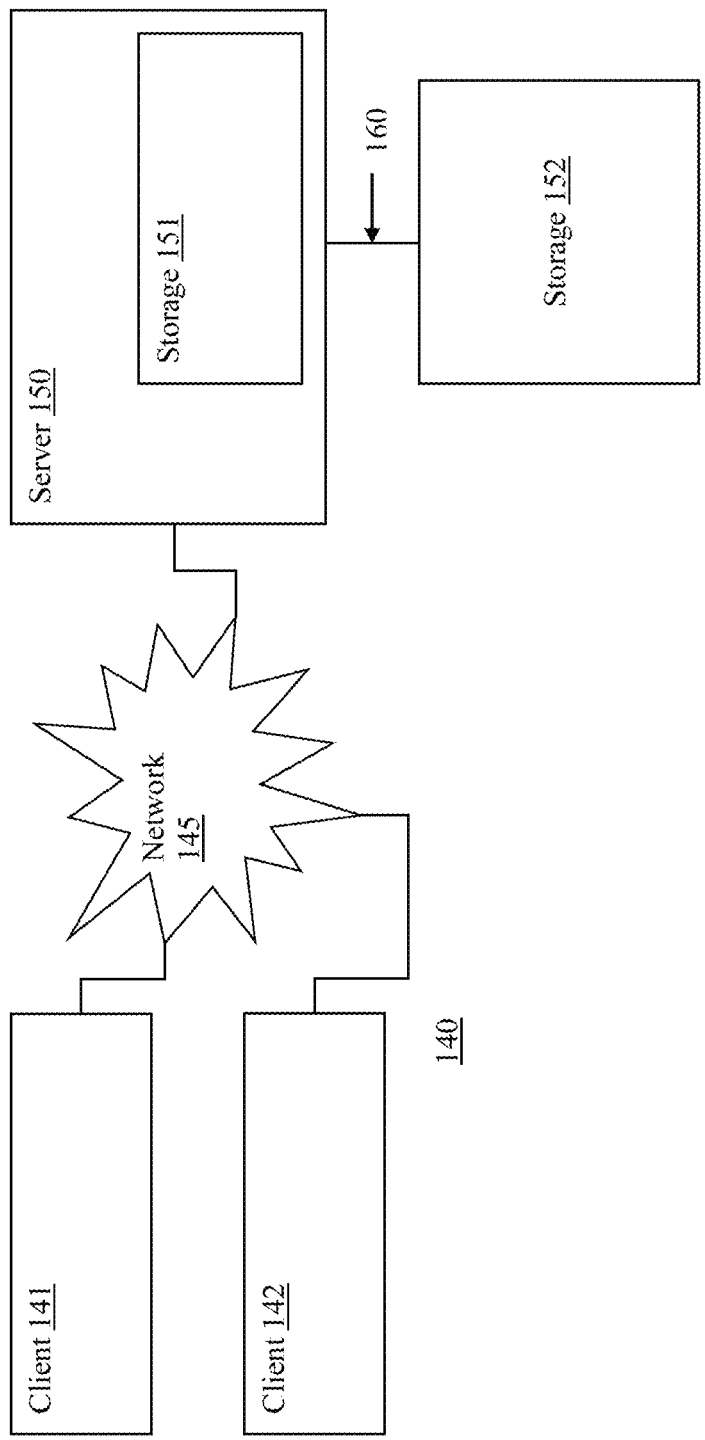
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method AR display 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
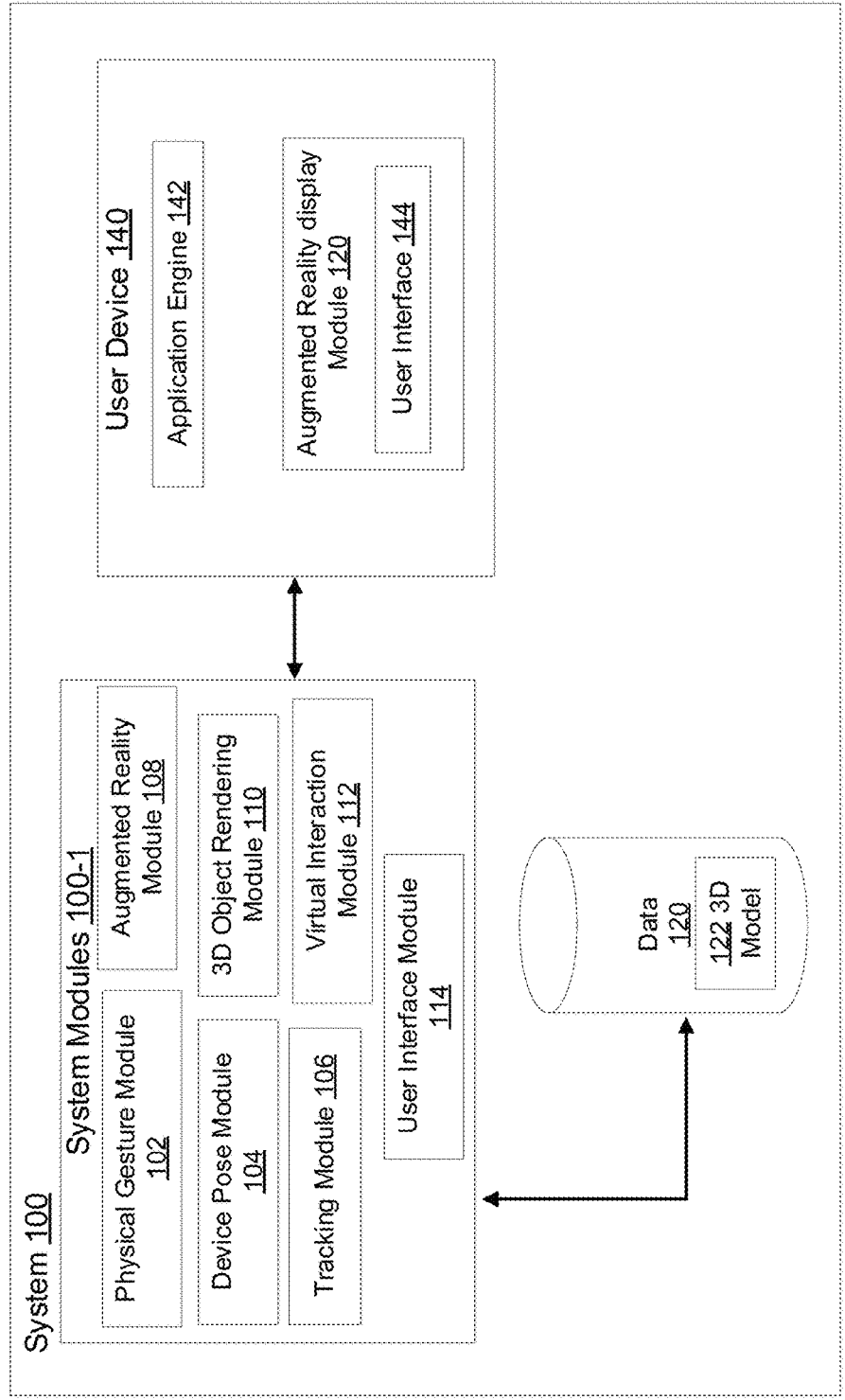
FIG. 1B is a diagram illustrating an exemplary environment in which some embodiments may operate.

FIG. 1B illustrates a block diagram of an example system 100 for an Interaction Engine that includes a physical gesture module 102, a device pose module 104, a tracking module 106, a an AR module 108, a 3D object rendering module 110, a virtual interaction module 112 and a user interface module 114. The system 100 may communicate with a user device 140 to display output, via a user interface 144 generated by an application engine 142. In various embodiments, the user device 140 may be an AR display headset device that further includes one or more of the respective modules 102, 104, 106, 108, 110, 112, 114.

The physical gesture module 102 of the system 100 may perform functionality, steps, operations, commands and/or instructions as illustrated in FIGS. 2A, 2B, 2C, 2D, 2E, 2F, 2G, 3, 4A, 4B, 5, 6A, 6B, 6C, 7A, 7B, 7C, 8A, 8B, 8C, 8D, 8E, 9A, 9B, 10, 11A and 11B ("FIGS. 2A-11B").

The device pose module 104 of the system 100 may perform functionality, steps, operations, commands and/or instructions as illustrated in FIGS. 2A-11B.

The tracking module 106 of the system 100 may perform functionality, steps, operations, commands and/or instructions as illustrated in FIGS. 2A-11B.

The augmented reality module 108 of the system 100 may perform functionality, steps, operations, commands and/or instructions as illustrated in FIGS. 2A-11B.

The 3D object rendering module 110 of the system 100 may perform functionality, steps, operations, commands and/or instructions as illustrated in FIGS. 2A-11B.

The virtual interaction module 112 of the system 100 may perform functionality, steps, operations, commands and/or instructions as illustrated in FIGS. 2A-11B.

The user interface module 114 of the system 100 may perform functionality, steps, operations, commands and/or instructions as illustrated in FIGS. 2A-11B.

A database 120 associated with the system 100 maintains information, such as 3D medical model data 122, in a manner the promotes retrieval and storage efficiency and/or data security. In addition, the model data 122 may include rendering parameters, such as data based on selections and modifications to a 3D virtual representation of a medical model rendered for a previous Augmented Reality display. In various embodiments, one or more rendering parameters may be preloaded as a default value for our rendering parameter in a newly initiated session of the Interaction Engine.

Figure 2A:
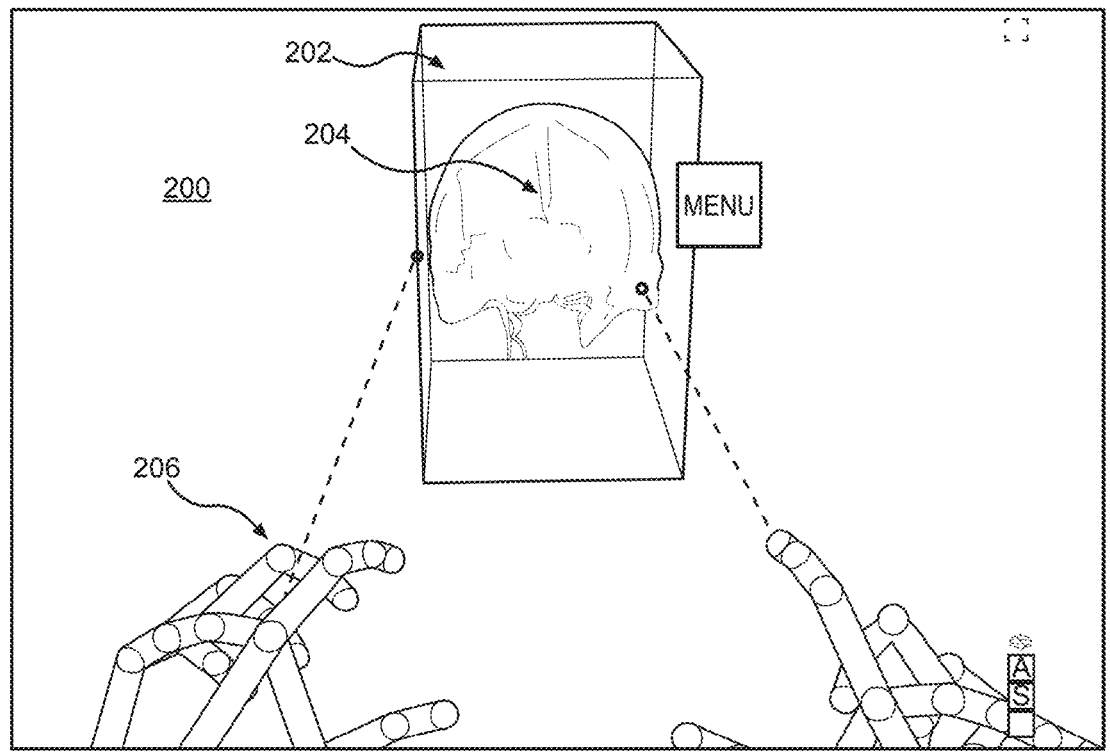
FIGS. 2A, 2B, 2C, 2D, 2E, 2F and 2G are each a diagram illustrating an exemplary environment in which some embodiments may operate.

As shown in FIG. 2A, a user may wear an Augmented-Reality (AR) headset device that displays an AR display 200. According to various embodiments, the AR headset device may implement one or more modules of the Interaction Engine. The Interaction Engine generates an AR display 200, a 3D virtual representation of a medical model container 202 ("virtual container"), a 3D virtual representation of a medical model 204 ("3D virtual medical model"), and a 3D virtual representation of a body part of the user 206 ("3D virtual hands").

In various embodiments, the Interaction Engine accesses one or more storage locations that contain respective portions of 3D medical model data. The 3D medical model data may include a plurality of slice layers of medical data associated with external and internal anatomies. For example, the 3D medical model data may include a plurality of slice layers that of medical data for illustrating external and internal anatomical regions of a user's head, brain and skull. It is understood that various embodiments may be directed to generating displays of any internal or external anatomical portions of the human body and/or animal bodies.

The Interaction Engine renders the medical model 204 in the AR display 200 based on the 3D medical model data. In addition, the Interaction Engine renders the 3D virtual medical model 204 in the virtual container 202 based on model pose data which describes an orientation and position of the rendering of the medical model 204. The Interaction Engine applies the model pose data to the 3D medical model data to determine one or more positional coordinates in the unified 3D coordinate system for portion of model data of each slice layer. The determined positional coordinates may further map to positional coordinates of a 3D interior space inside the virtual container 202.

The Interaction Engine further renders the 3D virtual medical model 204 based on a current device pose of an AR headset device worn by the user. The current device pose represents a current position and orientation of the AR headset device in the physical world. The Interaction Engine translates the current device pose to a position and orientation within the unified 3D coordinate system to determine the user's perspective view of the AR display 200. The Interaction Engine generates a rendering of the 3D virtual medical model 204 in the virtual container 202 according to the model pose data for display to the user in the AR display 200 according to the user's perspective view.

Figure 2B:
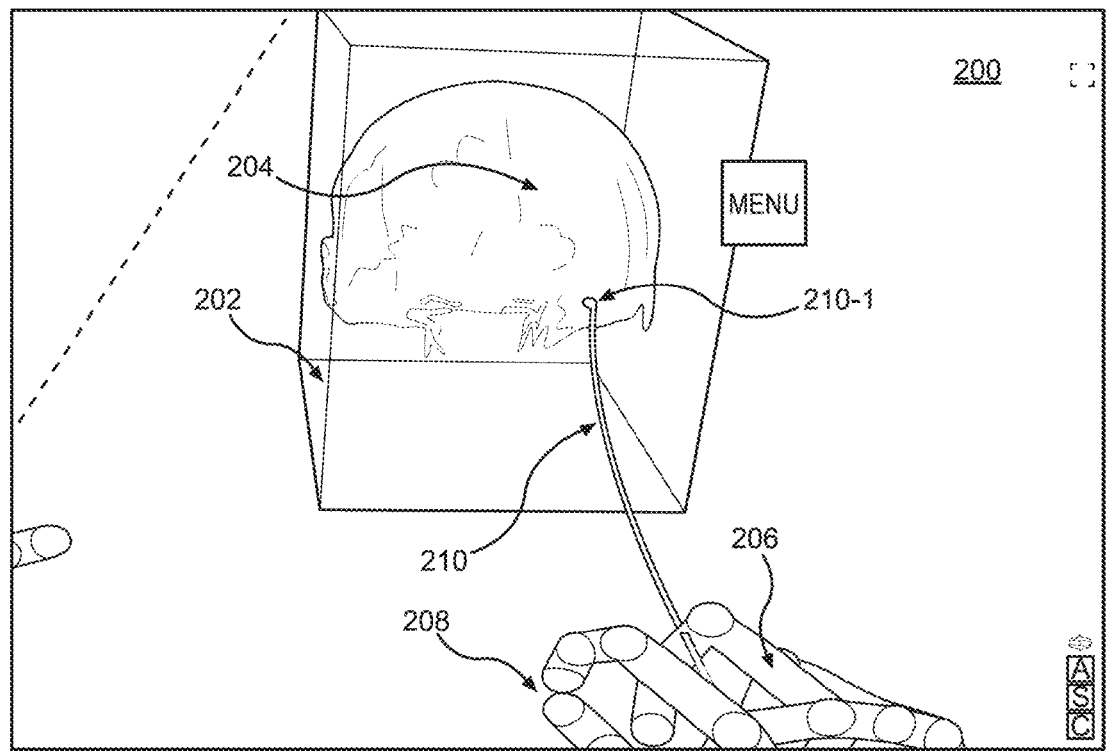

As shown in FIG. 2B, various embodiments described herein provide functionality for selection of the virtual container 202 and/or the tool for based on directional data associated with the 3D virtual hands 206. For example, the Interaction Engine tracks the user's hands via one or more tracking algorithms to determine hand direction(s) to further be utilized in determining whether one or more hand gestures performed by the user indicate selection of the virtual container 202, 3D virtual medical model 204 and/or one or more types of functionalities accessible via the AR display 200. For example, the Interaction Engine may track the user's hands and determine respective positions and changing positions of one or more hand joints. In various embodiments, the Interaction Engine may implement a simultaneous localization and mapping (SLAM) algorithm.

The Interaction Engine may generate direction data based at least in part on average distances between the user's palm and the user's fingers and/or hand joints. In some embodiments, the Interaction Engine generates direction data based on detected directional movement of the an AR headset device worn by the user. The Interaction Engine determines that the direction data indicates a position and orientation of the user's hands indicates a portion of the virtual container 202 and/or the 3D virtual medical model 204 with which the user seeks to select and/or virtually interact with. In some embodiments, the Interaction Engine may implement a ray casting algorithm to generate a selection ray 210 displayed in the AR display 200 extending from the 3D virtual hands 206 to the virtual container 202 and/or 3D virtual medical model 204. For example, the terminal portion 210-1 of the selection ray 210 may have the same positional coordinates as a displayed portion of the virtual container 202 and/or 3D virtual medical model 204. The displayed portion having the same positional coordinates may be identified by the Interaction Engine as a portion of the virtual container 202 and/or 3D virtual medical model 204 for the user seeks to select and/or virtually interact with.

According to various embodiments, the Interaction Engine may implement a collision algorithm to determine a portion of the virtual container 202 and/or 3D virtual medical model 204 the user seeks to select and/or virtually interact with. For example, the Interaction Engine may track the user's hands and display the 3D virtual hands 206 in the AR display 200 according to respective positional coordinates in the unified 3D coordinate system that correspond to the orientation of the user's hands in the physical world. The Interaction Engine may detect that one or more positional coordinates for displaying the 3D virtual hands 206 in the AR display 200 may overlap (or be the same as) one or more positional coordinates for displaying the virtual container 202 and/or the medical model 204. In response to detecting the overlap, the Interaction Engine may determine that the user seeks to select and/or virtually interact with a portion of the virtual container 202 and/or 3D virtual medical model 204 that overlaps with the 3D virtual hands 206.

According to various embodiments, upon determining the user seeks to select and/or virtually interact with a portion of the virtual container 202 and/or medical model 204, the Interaction Engine may detect one or more changes in hand joint positions 208 and identify the occurrence of the changes in hand joint positions as a performed selection function. For example, a performed selection function may represent an input command to the Interaction Engine confirming the user is selecting a portion of the virtual container 202 and/or 3D virtual medical model 204 identified via the ray casting algorithm and/or collision algorithm. For example, the performed selection function may also represent an input command to the Interaction Engine confirming the user is selecting a particular type of virtual interaction functionality. For example, the user may perform a physical gesture of tips of two fingers touching to correspond to a virtual interaction representing an input command, such as a select input command.

Figure 2C:
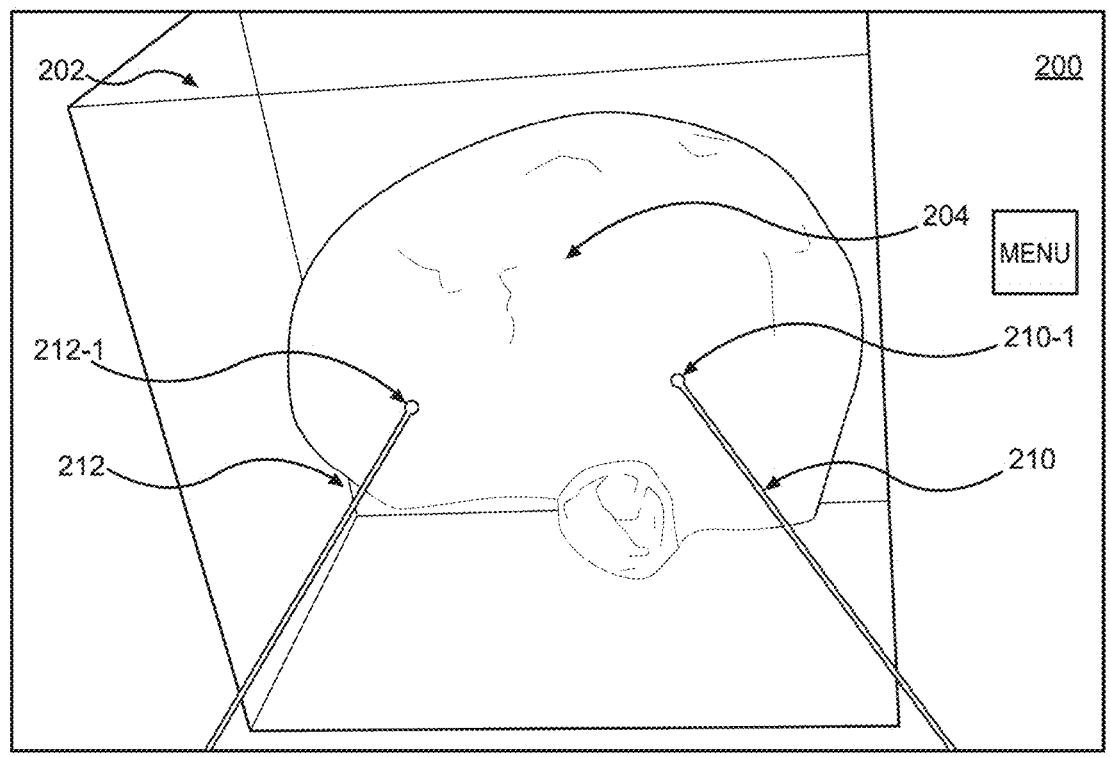

As shown in FIG. 2C, the Interaction Engine displays multiple selection rays 210, 212 based at least in part on direction data associated with the 3D virtual hands 206. Each of the selection rays 210, 212 have a terminus portion 210-1, 212-1 that visually demarcate a respective portion of the 3D virtual medical model 204 with which the user seeks to visually interact. In various embodiments, a virtual interaction may result from one or more performed physical hand gestures the Interaction Engine detects. The Interaction Engine may generate various types of movement data based on the detected physical hand gestures. For example, once the user has selected the 3D virtual medical model 204 based on the displayed selection rays 210, 212, the user may perform a gesture that physically moves the user's hands away from each other. The one or more sensors associated with the AR headset device and/or the Interaction Engine may detect and track movement of the hands as a physical distance between the hands grows in order to implement a zoom-in virtual interaction in the AR display 200. For example, as the hands move and the distance between the hands grows, the Interaction Engine may generate positional coordinates of the 3D virtual medical model 204 according to the unified 3D coordinate system for display in the AR display 200 such that an updated display of the 3D virtual medical model 204 portrays the 3D virtual medical model 204 as gradually moving closer into a perspective view of the user. If the tracked movement of the hands results in a physical distance between the hands becoming smaller, the Interaction Engine may implement a zoom-out virtual interaction in the AR display 200. For example, as the hands move and the distance between the hands is reduced, the Interaction Engine may generate positional coordinates for displaying the 3D virtual medical model 204 as gradually moving away from the perspective view of the user in the AR display 200.

Figure 2D:
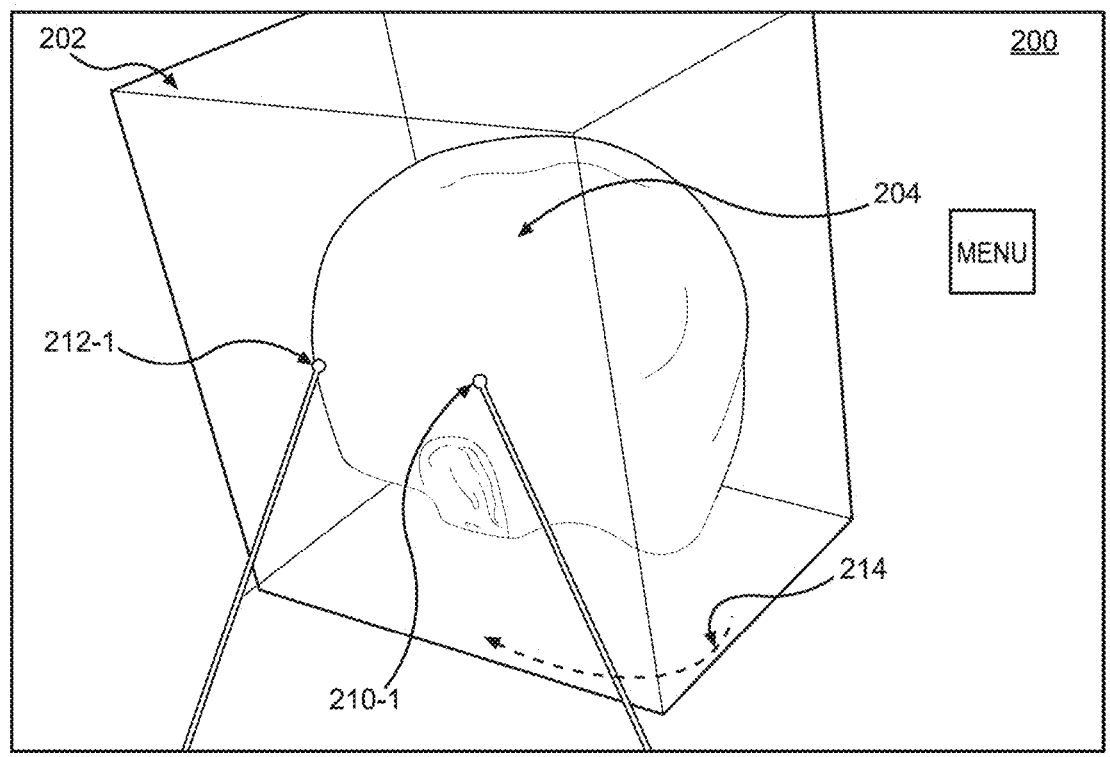

As shown in FIG. 2D, the Interaction Engine may implement a rotate virtual interaction in which the Interaction Engine detects physical movement of the user's hands. The Interaction Engine may generate positional coordinates that correspond to the detected physical movement of the hands to display the virtual container 202 and/or 3D virtual medical model 204 as gradually rotating 214 in the AR display 200. In various embodiments, it is understood that the 3D virtual medical model 204 will be displayed in the virtual container 202 according to a model pose. The model pose may define an orientation and position of the 3D virtual medical model 204 within the virtual container 202. Further, the model pose may further define which respective portions of the 3D virtual medical model 204 will be displayed in the virtual container 202 based on a display position and orientation of the virtual container 202 and pose data of the AR headset device. It is understood the pose data of the AR headset device represents respective positions and orientations of the AR headset device in the physical world.

In some embodiments, the rotate virtual interaction may rotate a position and orientation of the virtual container 202 in the AR display 200 without changing the model pose of the 3D virtual medical model 204 displayed in the virtual container 202. However, as the display of the virtual container 202 rotates in the AR display 200, the Interaction Engine updates the display of the 3D virtual medical model 204 according to new display position(s) of the rotating virtual container 202 and the model pose. Stated differently, although the model pose will not be changed, the 3D medical model data portrayed in the rotating medical model 204, as a consequence of the virtual container's 202 rotation, will be changed since the user's perspective view of the rotating 3D virtual medical model 204 will bring into view different respective portions of the 3D virtual medical model 204 at the same model pose. In some embodiments, the rotate virtual interaction may rotate a position and orientation of the 3D virtual medical model 204 in the virtual container 202 without rotating a position and orientation of the virtual container 202. Stated differently, the Interaction Engine may implement the rotate virtual interaction to display the 3D virtual medical model 204 as gradually rotating—and therefore changing the model pose—within the virtual container 202 while the display position of the virtual container 202 is not changed or rotated.

Figure 2E:
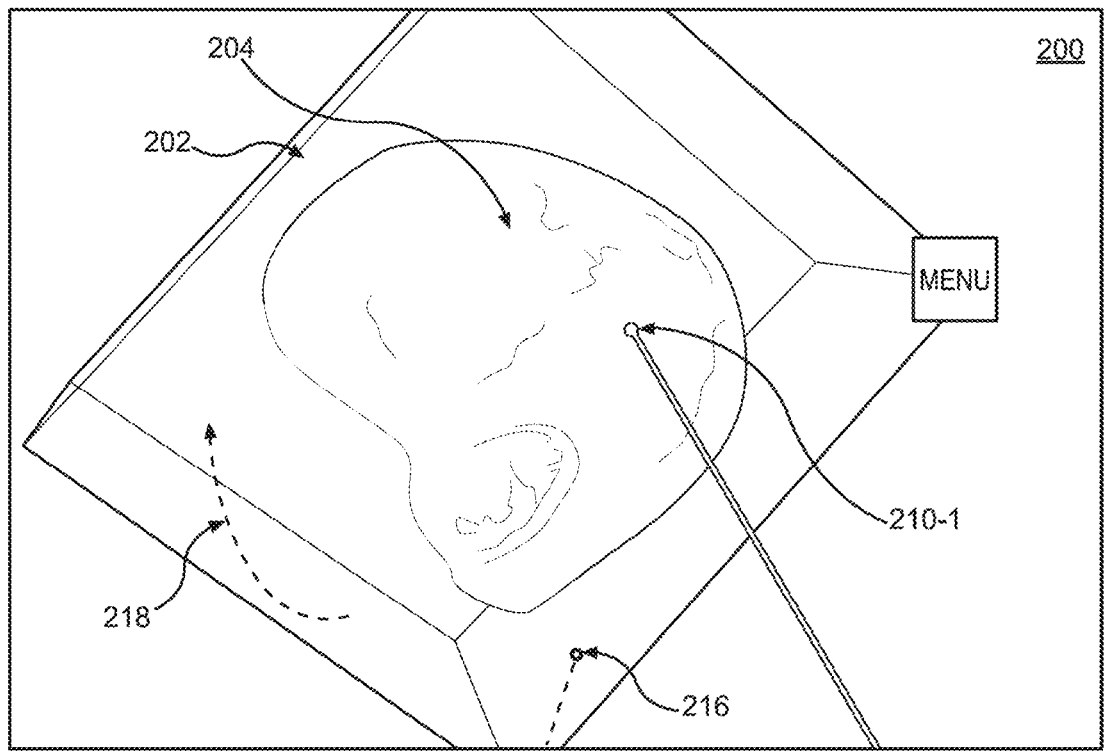
Figure 2F:
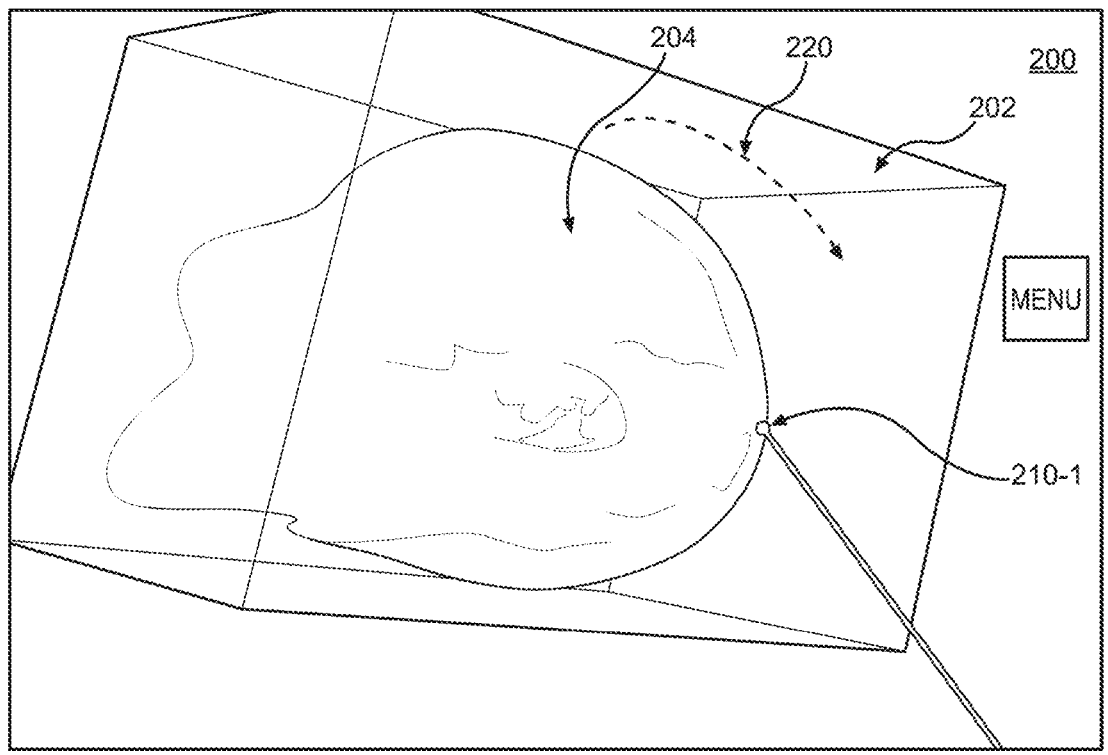

As shown in FIGS. 2E and 2F, the Interaction Engine may implement various rotate virtual interactions based on the user selecting a portion of the 3D virtual medical model 204 and a portion 216 of a surface of the virtual container 202. The Interaction Engine displays the virtual container 202 as rotating according to a rotation direction 218 while the model pose of the 3D virtual medical model 204 in the virtual container 202 is not changed.

Figure 2G:
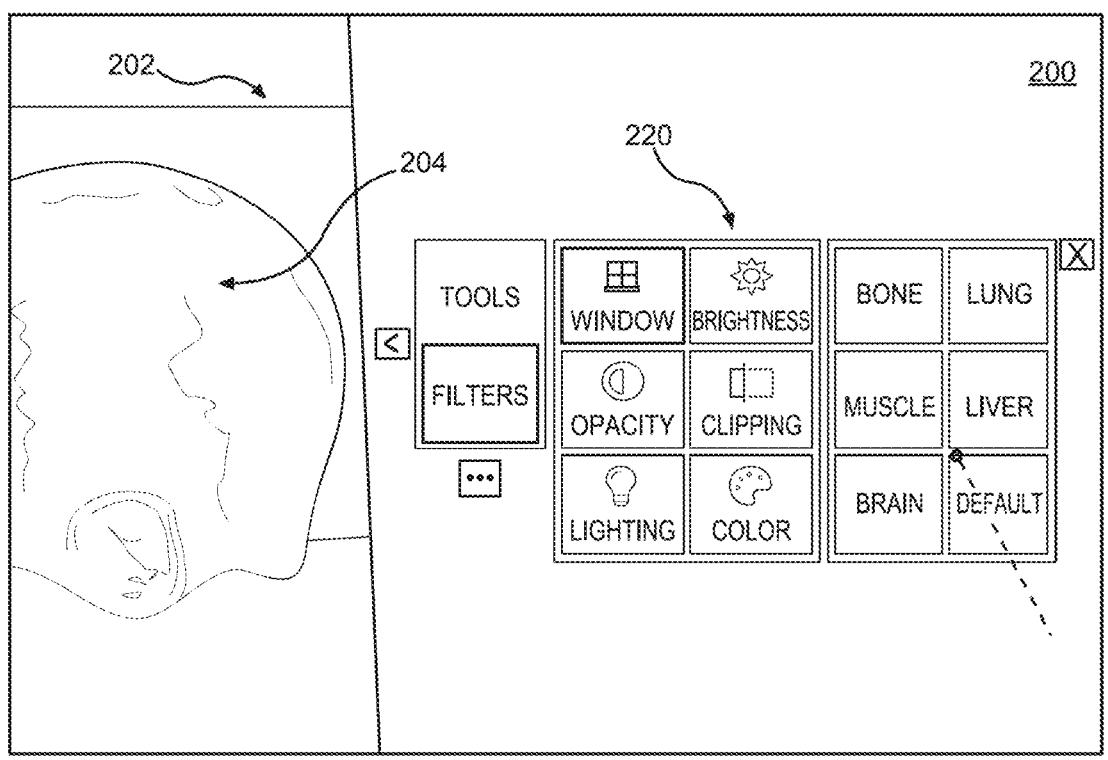

As shown in FIG. 2G, a menu 220 may be concurrently displayed with the virtual container 202 and the 3D virtual medical model 204 in the AR display 200. The menu 220 may display selectable menu items that correspond to various types of selectable virtual interactions. It is understood that a user may perform a physical gesture in order to select a desired menu item for a particular virtual interaction. In response to the selection, the Interaction Engine may modify the AR display 200 with one or more AR display interface elements that correspond with the selected type of virtual interaction. In addition, according to various embodiments, the Interaction Engine may update a display of one or more portions of the menu 220 whereby such updated portions correspond to the selected virtual interaction. The Interaction Engine may further modify a display position and/or a display size of the menu 220 in response to the selected virtual interaction.

Figure 3:
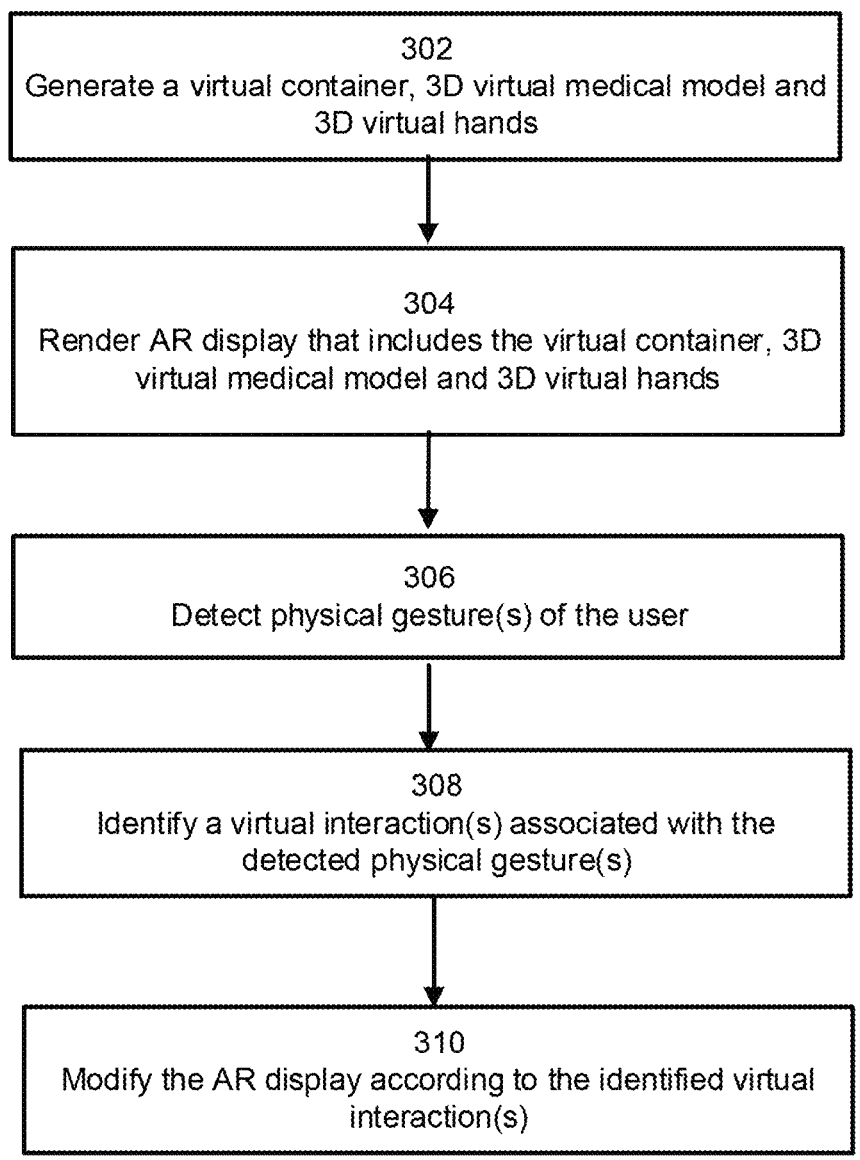
FIG. 3 is a diagram illustrating an exemplary method that may be performed in some embodiments.

As shown in flowchart 300 of FIG. 3, the Interaction Engine generates a virtual container 202, a 3D virtual medical model 204 and 3D virtual hands. (Act 302) According to various embodiments, display of the virtual container 202 includes the 3D virtual medical model 204 positioned according to a current model pose. In various embodiments, the current model pose may be a position and orientation of the 3D virtual medical model 204 defined according to one or more positional coordinates native to the interior of the virtual container 202. The AR display 200 further includes display of the 3D virtual hands 206. The 3D virtual hands 206 may be associated with one or both of the user's physical hands and the Interaction Engine may receive sensor data from one or more sensors associated with the AR headset device that track respective positions and orientations each of the user's physical hands. In various embodiments, the Interaction Engine may display a graphic indicator representing head direction. Such a graphic indicator for head direction may, for example, allow for a user to indicate to the Interaction Engine to update the AR display 200 based at least in part on direction data based on movement of the AR headset device.

The Interaction Engine renders an AR display 200 that includes concurrent display of the virtual container 202, the 3D virtual medical model 204 and the 3D virtual hands. (Act 304) In various embodiments, the AR display 200 is rendered by the Interaction Engine according to a unified 3D coordinate system which defines multiple respective coordinate positions for concurrent placement and display of one or more rendered objects. In various embodiments, the Interaction Engine may generate a display position for the 3D virtual hands 206 in the AR display 200 according to the unified 3D coordinate system based at least on the received sensor data.

The Interaction Engine detects physical gestures performed by the user. (Act 306) In various embodiments, the Interaction Engine may include one or more cameras or sensors for visually tracking the user's physical hand movements and respective positions of the user's hands and current/updated positions of one or more of the user's hand joints. For example, the one or more cameras may be disposed on the AR headset device. In various embodiments, the Interaction Engine may further receive head pose tracking data and/or eye tracking data from the AR headset device worn by the user. The Interaction Engine may generate direction data or augment direction data based at least in part on the head pose data and/or the eye tracking data. For example, the head pose tracking data may be based on a position(s) and orientation(s) of the AR headset device in the physical world as the user moves the user's head. For example, the eye tracking data may be based on data generated by one or more cameras or sensors on the AR headset device directed at the user's eyes in order to track movements of one or more portions of the user's eyes and changes of positions of those one or more portions of the user's eyes.

The Interaction Engine identifies one or more virtual interactions associated with the detected physical gestures. (Act 308) In various embodiments, the Interaction Engine identifies a virtual interaction selected by the user, or to be performed by the user, based on selection of one or more functionalities from a menu 220 displayed in the AR display 200. In addition, the Interaction Engine identifies a virtual interaction selected by the user according to one or more pre-defined gestures that represent input commands for the Interaction Engine. In some embodiments, a particular virtual interaction may be identified based on a sequence of performed physical gestures detected by the Interaction Engine. In some embodiments, a particular virtual interaction may be identified as being selected by the user based on a series of preceding virtual interactions.

The Interaction Engine modifies the AR display 200 according to the identified virtual interactions. (Act 310) In various embodiments, the Interaction Engine modifies the AR display 200 according to a selection virtual interaction, a zoom-in virtual interaction, a zoom-out virtual interaction and/or a rotation virtual interaction. In various embodiments, the Interaction Engine modifies the AR display 200 according to a windowing virtual interaction, a tap-to-place virtual interaction and/or a clipping plane virtual interaction. In various embodiments, the Interaction Engine modifies the AR display 200 according to a multi-axis cropping virtual interaction, a slice-scroll bar virtual interaction and parameter tuning virtual interaction, a scout virtual interaction, an annotation virtual interaction and/or a reset virtual interaction.

Figure 4A:
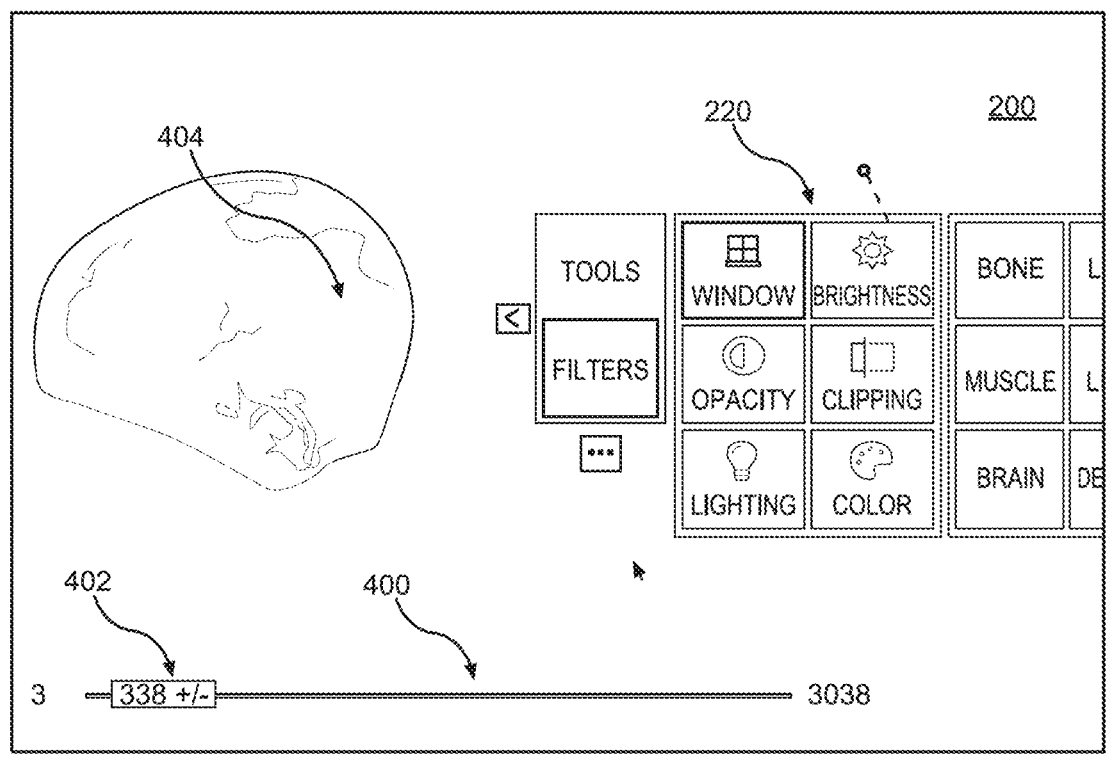
FIGS. 4A and 4B are each a diagram illustrating an exemplary environment in which some embodiments may operate.

As shown in FIG. 4A, the Interaction Engine may provide functionality for a windowing virtual interaction. According to various embodiments, the Interaction Engine displays a voxel value range 400 in the AR display 200. The voxel value range 400 represents the voxel values of the 3D medical model data used to generate display of the 3D virtual medical model 204. The Interaction Engine further displays a range portion 402 in the voxel value range 400. It is understood that the length of the range portion 402 is adjustable and can be selected by the user based on one or more virtual interactions with the range portion 402. For example, the Interaction Engine may detect a selection of the range portion 402 and subsequent physical gestures may correspond to additional virtual interactions for adjusting the length of the range portion 402. It is understood that when the length of the range portion 402 is adjusted, the number of different voxel values included within the range portion 402 is increased or decreased.

According to various embodiments, the Interaction Engine applies to the range portion 402 a color gradient palette representing a gradual change of color shades that occur between black and white. The color gradient palette may extend over the complete length of the range portion 402, such that the respective voxel values that fall within the range portion 402 are assigned to varying shades of black, gray or white according to the distribution of shades in the color gradient palette. For example, lower voxel values in the range portion 402 may be assigned various shades of black whereas higher voxel values may be assigned various shades of white. Respective voxel values in a middle of the range portion 402 may therefore be assigned various shades of gray that occur in the color gradient palette as the distribution of black decreases and the distribution of white increases. It is understood that various embodiments of the color gradient palette are not limited to black and white. Rather, the color gradient palette can be based on any number of colors and any types of colors.

In various embodiments, the Interaction Engine may detect the user has selected, via one or more virtual interactions, a desired length of the range portion 402. The Interaction Engine assigns each respective color shade in the color gradient palette to a corresponding voxel value that falls within the range portion 402. The Interaction Engine identifies various portions of the 3D medical model data that have the respective voxel values that fall within the length of the range portion 402. The Interaction Engine updates the display of the 3D virtual medical model 204 to generate a medical model window 404 in the AR display 200. The medical model window 404 portrays in the AR display 200 the identified 3D medical model data that corresponds to the voxel values of the 402. Each identified portion of the 3D medical model data displayed in the medical model window 404 is displayed according to the corresponding shade of black, gray or white that is assigned to that data's voxel value by the color gradient palette applied to the range portion 402. For example, the identified portion of the 3D medical model data may correspond to more external anatomical characteristics than internal anatomical characteristics. The color gradient palette will be distributed to those voxel values of the identified portion of the 3D medical model data and the voxel values outside of the length of the range portion 402 will not be rendered by the Interaction Engine. The Interaction Engine thereby renders the voxels of the identified 3D medical model data according to their respective colors from the color gradient palette.

In various embodiments, in response to detecting selection of the windowing virtual interaction, the Interaction Engine may temporarily disable updating a display position of the 3D virtual medical model 204 based on hand gesture direction data (or any other type of direction data). During implementation of the windowing virtual interaction, the Interaction Engine may detect and gesture direction data as corresponding to selections of the range portion 402. For example, the Interaction Engine may detect hand gesture direction data that corresponds to the user performing a physical gesture in which a hand is moved horizontally left-to-right and/or right-to-left. The horizontal hand physical gesture may be processed by the Interaction Engine as selections of a modification to the desired length of the range portion 402. In some embodiments, a detected vertical hand physical gesture may be processed by the Interaction Engine as selections of a modification to a length of the voxel value range 400 and/or the color gradient palette itself. In some embodiments, the Interaction Engine may display a submenu that corresponds to the windowing virtual interaction. For example, the submenu may display one or more selectable functionalities and presets that can be applied to the AR display 200 during the windowing virtual interaction.

Figure 4B:
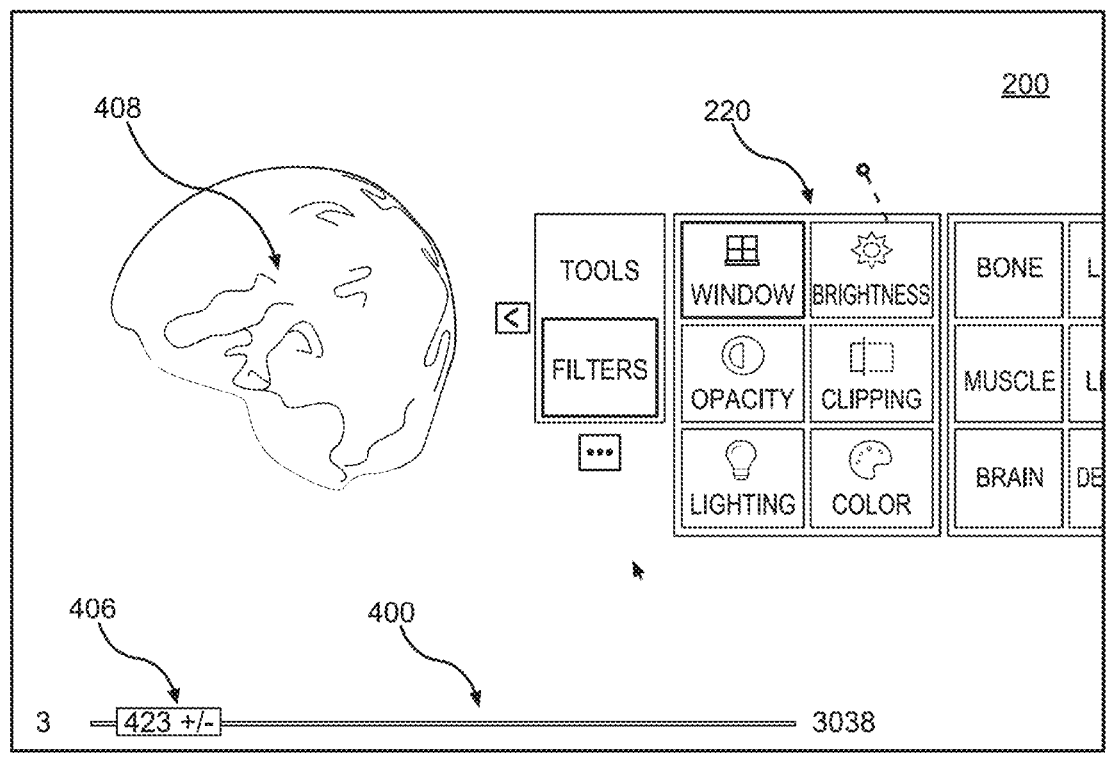

As shown in FIG. 4B, the interaction display engine displays a medical model window 408 based on 3D medical model data that corresponds to voxel values of a range portion 406 having an updated length and therefore a different number of voxel values. In addition, the range 406 is situated on the voxel value range 400 at a different position, and therefore the 3D medical model data displayed in the medical model window 408 is different than the 3D medical model data displayed in the previous medical model window 404. For example, the 3D medical model data may represent more internal anatomical characteristics than external anatomical characteristics. Any 3D medical model data with voxel values outside of the range 406 will not be rendered by the Interaction Engine. The 3D medical model data with voxel values within the range 406 will be assigned various shades of the colors of the color gradient palette. The Interaction Engine may render the 3D medical model data with voxel values within the range 406 according to their assigned color shade. For example, the medical model window may thereby illustrate color shaded internal anatomical characteristics and block display of any 3D medical model data with voxel values outside the range 406. According to various embodiments, the Interaction Engine saves the selected desired length of the range portion 402 as a saved rendering parameter that may be accessible for rendering in a subsequent AR display.

Figure 5:
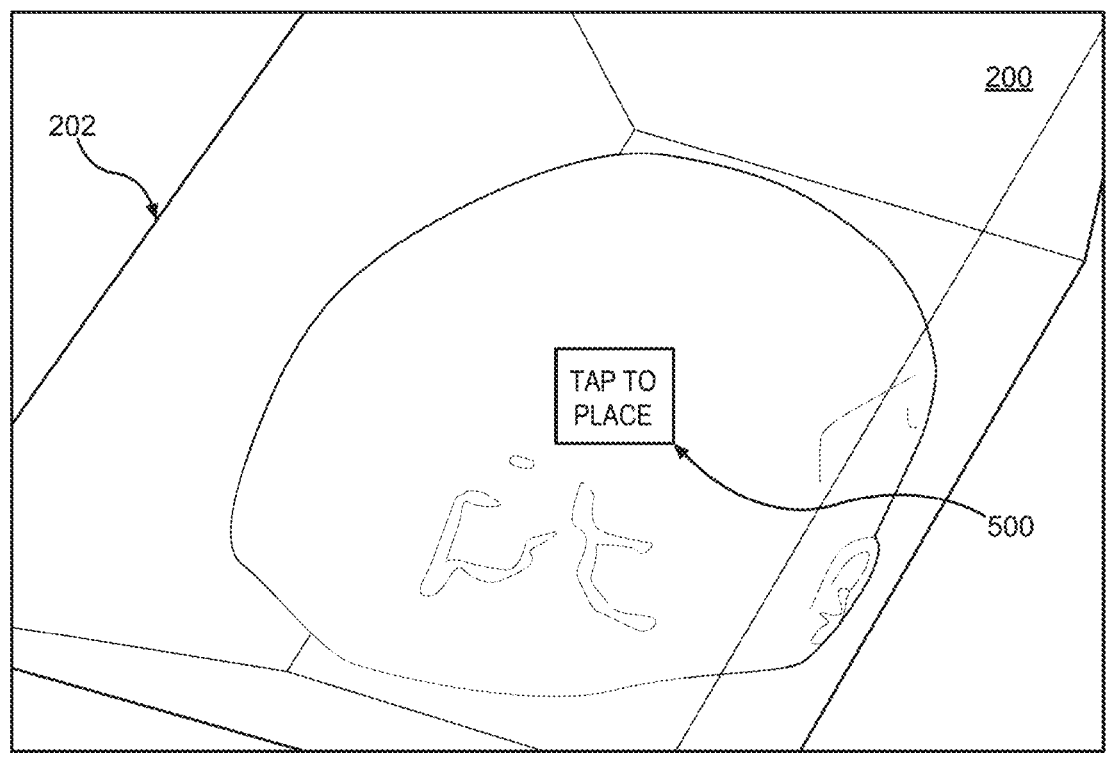
FIG. 5 is each a diagram illustrating an exemplary environment in which some embodiments may operate.

As shown in FIG. 5, the Interaction Engine may provide functionality for a tap-to-place virtual interaction. According to various embodiments, the Interaction Engine may display in the AR display 200 a selectable functionality 500 to trigger the tap-to-place virtual interaction. Upon detecting selection of the selectable functionality 500 by one or more virtual interactions that correspond with physical movement of the user, the Interaction Engine determines a current position of the virtual container 202 and fixes the current position as a stationary display position of the virtual container 202 in the unified 3D coordinate system of the AR display 200. The Interaction Engine may detect movement of the AR headset device worn by the user and generates updated pose data for the AR headset device. It is understood that the updated pose data represents a position and orientation of the AR headset device in the physical world during and as a consequence of the detected movement of the AR headset device. The Interaction Engine updates a perspective view of the AR display 200 based at least on the pose data in the Interaction Engine renders the updated perspective view of the AR display 200 in accordance with the unified 3D coordinate system. In some embodiments, the updated perspective view of the AR display 200 may include positional coordinates of the unified 3D coordinate system that do not include the stationary display position of the virtual container 202. As the Interaction Engine renders the updated perspective view of the AR display 200, the virtual container 202 will fall out of view in the AR display 200 due to the stationary display position of the virtual container 202 being maintained.

Figure 6A:
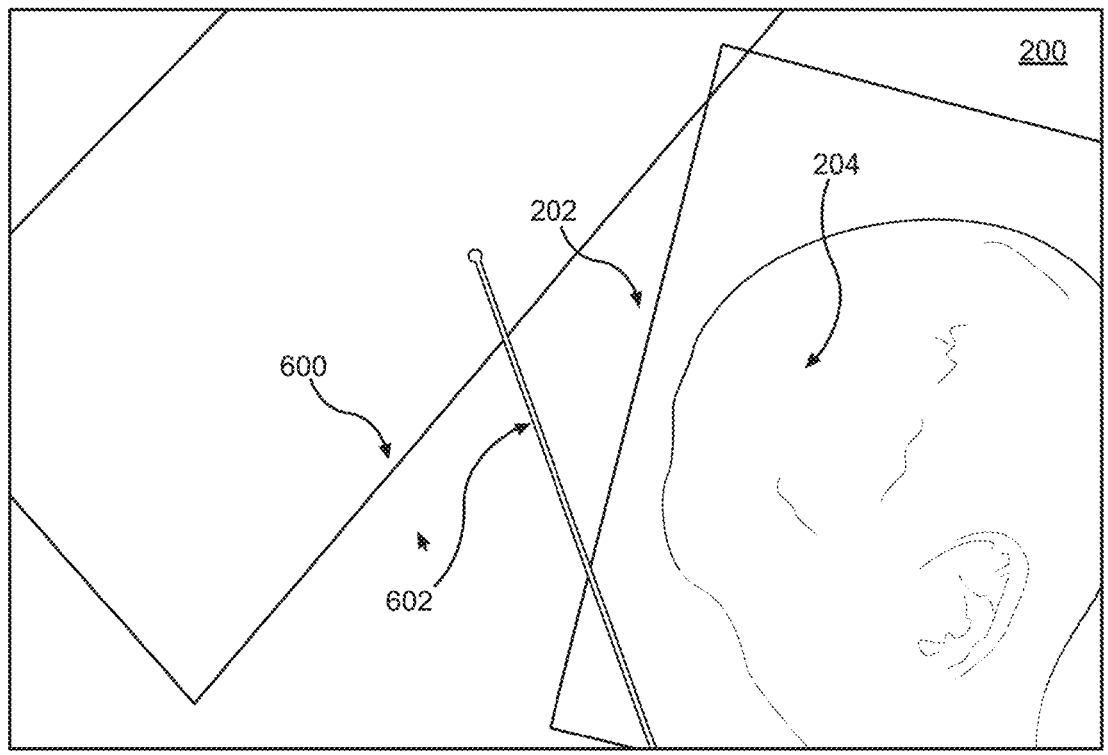
FIGS. 6A, 6B and 6C are each a diagram illustrating an exemplary environment in which some embodiments may operate.

As shown in FIG. 6A, the Interaction Engine may provide functionality for a clipping plane virtual interaction. The Interaction Engine displays a clipping plane 600 concurrently with the virtual container 202 and the 3D virtual medical model 204 in the AR display 200. The Interaction Engine may detect selection by the user of the clipping plane 600. For example, the Interaction Engine may implement a ray casting algorithm as described herein to cast a selection ray 602 towards the clipping plane 600 to represent that physical movement performed by the user results in displayed movement of the clipping plane 600 in the AR display 200.

Figure 6B:
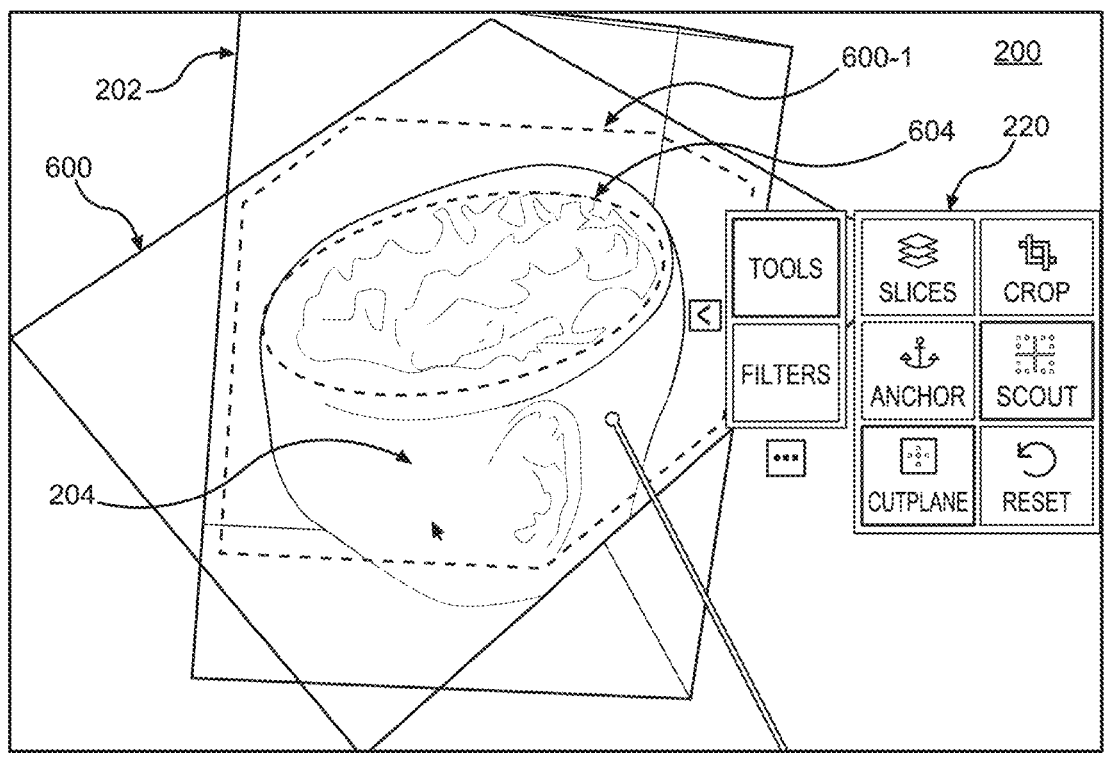

As shown in FIG. 6B, the Interaction Engine displays the clipping plane 600 at a display position as a result of the clipping plane 600 being moved by respective virtual interactions that correspond with various physical movements of the user's hands. The Interaction Engine determines that the clipping plane 600 intersects with the virtual container 202 and the 3D virtual medical model 204 due to the display position of the clipping plane 600. The Interaction Engine identifies portions of the clipping plane 600-1 that intersect with the interior of the virtual container 202. For example, the Interaction Engine identifies positional container coordinates within the interior of the virtual container 202 that are included in parts of the clipping plane 600 that are also displayed in the interior of the virtual container 202. In addition, the Interaction Engine determines medical model data 604 for the 3D virtual medical model 204 in its current model pose, whereby the medical model data 604 represents medical model data 604 that maps to one or more of the positional container coordinates 600-1 of the intersection between the virtual container 202 and clipping plane 600. For example, the Interaction Engine determines medical model data 604 that represents both external and internal anatomical regions. The Interaction Engine updates the 3D virtual medical model 204 to include portrayal of the medical model data 604 and concurrently displays the updated 3D virtual medical model 204 and the clipping plane 600 at its display position and the virtual container 202.

Figure 6C:
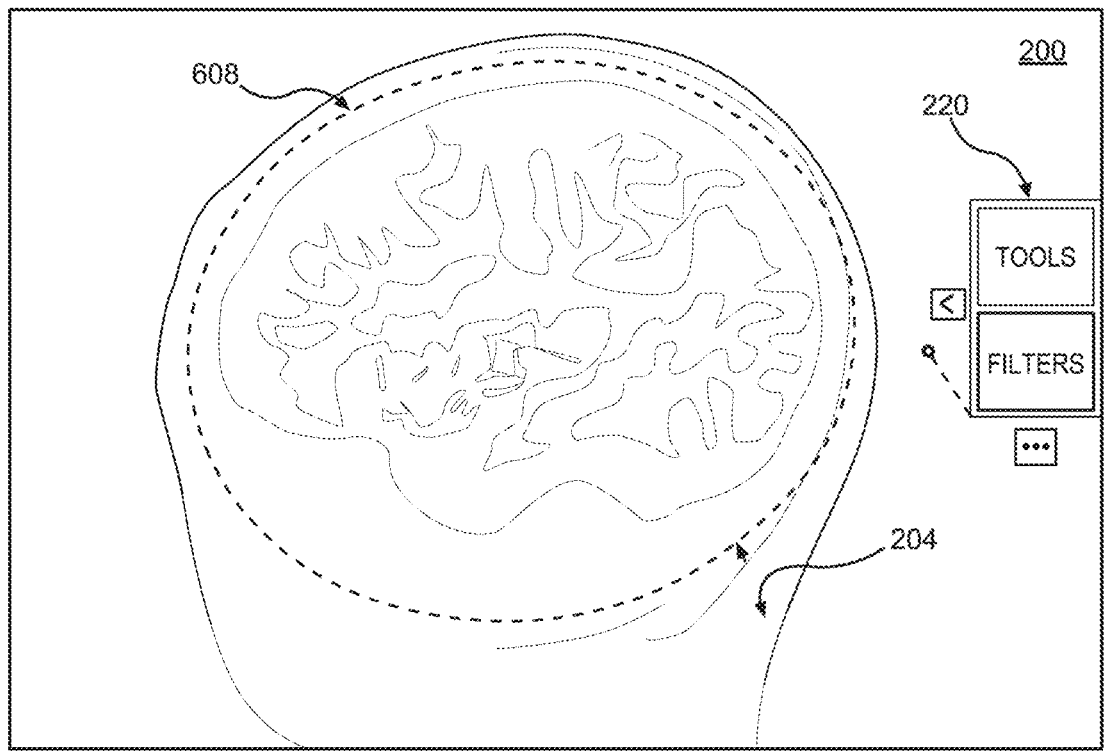

As shown in FIG. 6C, the Interaction Engine may represent movement by a clipping plane based on movement of the user's head as represented by pose data generated by the AR headset device as the user moves the headset device. For example, the Interaction Engine renders graphic results of movement of a clipping plane towards the 3D virtual medical model 204 as the user physically steps forward and/or physically moves the AR headset device in a particular direction(s). For example, the Interaction Engine may not include display of the clipping plane 600 in the AR display 200, but renders display of medical model data 608 that corresponds to positional coordinates within an intersection of the 3D virtual medical model 204 and positional coordinates in the unified 3D coordinate system representing the current pose(s) (i.e. position(s) and orientation(s)) of the AR headset device.

Figure 7A:
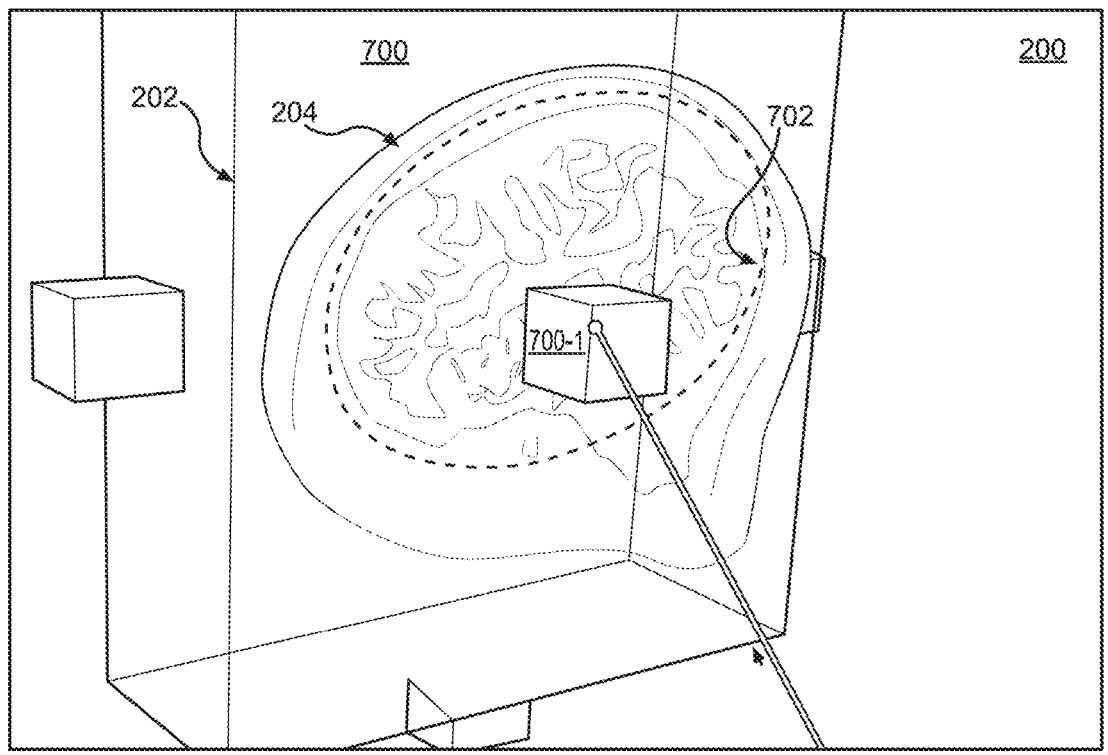
FIGS. 7A, 7B and 7C are each a diagram illustrating an exemplary environment in which some embodiments may operate.

As shown in FIG. 7A, the Interaction Engine may provide functionality for a multi-axis cropping virtual interaction. In various embodiments, the Interaction Engine generates a display of the virtual container 202 with one or more movable surfaces. For example, a respective surface 700 may be displayed with a selection shape 700-1, such as a selection cube. A user may perform one or more physical gestures that correspond to virtual interactions for selection of the selection shape 700-1, such as through raycasting. Upon selection of the selection shape 700-1, the Interaction Engine may detect subsequent movements performed by the user that map to virtual interactions for changing a display position of the surface 700 that is associated with the selected selection shape 700-1. As the user performs the subsequent movements, the display position in the AR display 200 of the surface 700 is adjusted with respect to the display positions of the other surfaces of the virtual container 202.

As the coordinate positions of the selected surface 700 in the unified 3D coordinate space are updated by the Interaction Engine, the Interaction Engine further updates a display position(s) of the surface 700 based on the changing coordinate positions. The Interaction Engine may determine that an updated display position(s) of the selected surface 700 results in an intersection between the selected surface 700 and a display position of the 3D virtual medical model 204 within the virtual container 202. The Interaction Engine identifies portions of the selected surface 700 that are bounded within the intersection. For example, the Interaction Engine identifies portions 702 of the selected surface 700 with respective coordinate positions that correspond to 3D medical model data for the 3D virtual medical model 204 with respect to the current pose of the 3D virtual medical model 204 in the virtual container 202. The Interaction Engine updates the display of the 3D virtual medical model 204 to include portrayal of the identified 3D medical model data 702.

Figure 7B:
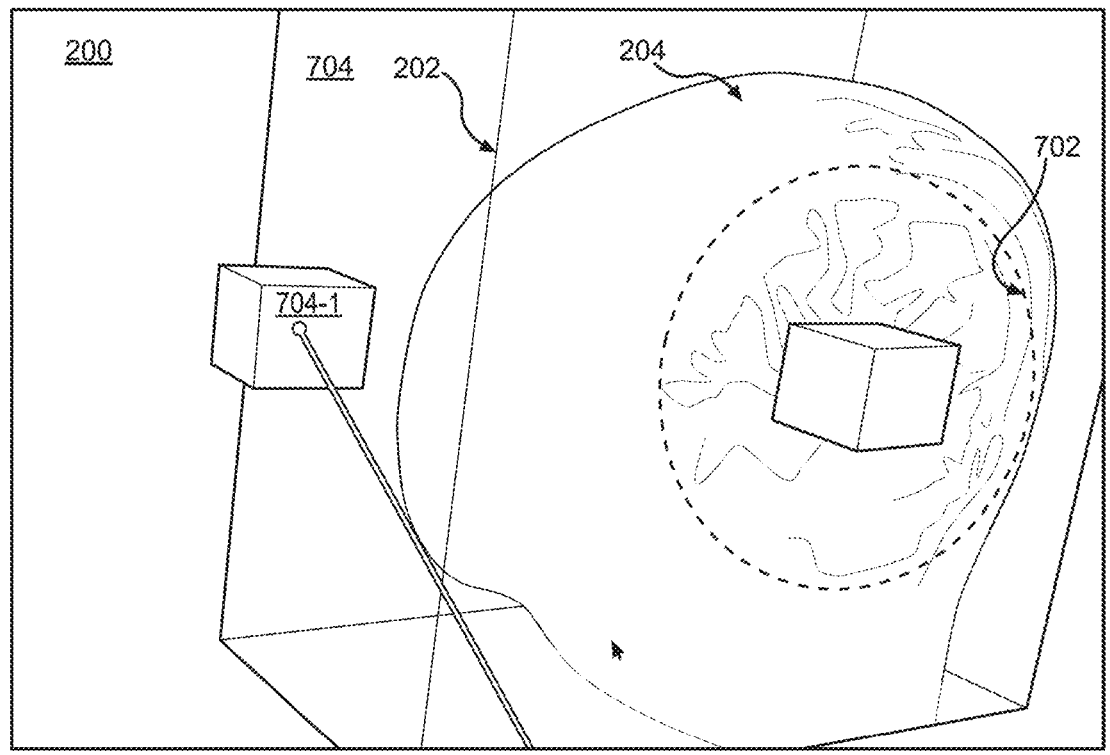
Figure 7C:
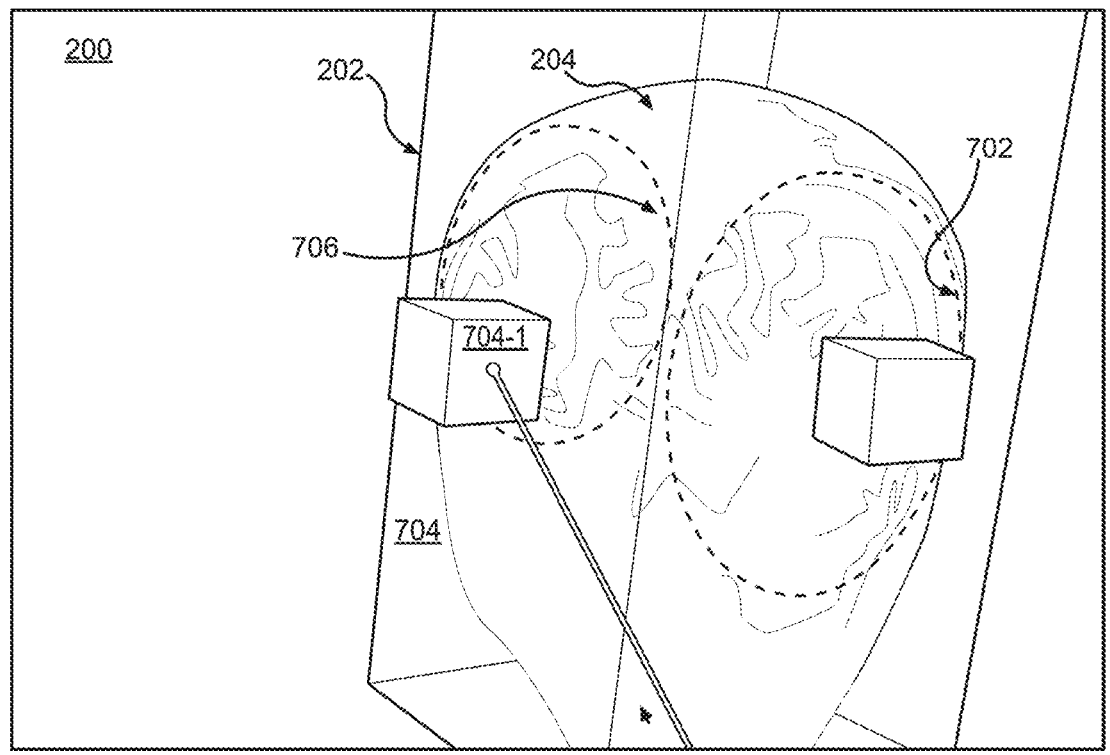

As shown in FIG. 7B, subsequent detected movements may further correspond to respective virtual interactions that select another surface 704 of the virtual container 202 via selection of its associated selection shape 704-1. As shown in FIG. 7C, the Interaction Engine may update the display position of the selected surface 704 such that another intersection occurs with the 3D virtual medical model 204 within the virtual container 202. The Interaction Engine identifies portions of the selected surface 704 that are bounded within the intersection. For example, the Interaction Engine identifies portions 706 of the selected surface 704 with respective coordinate positions that correspond to additional 3D medical model data for the medical model 204. The Interaction Engine updates the display of the 3D virtual medical model 204 to include portrayal of the identified additional 3D medical model data 702.

Figure 8A:
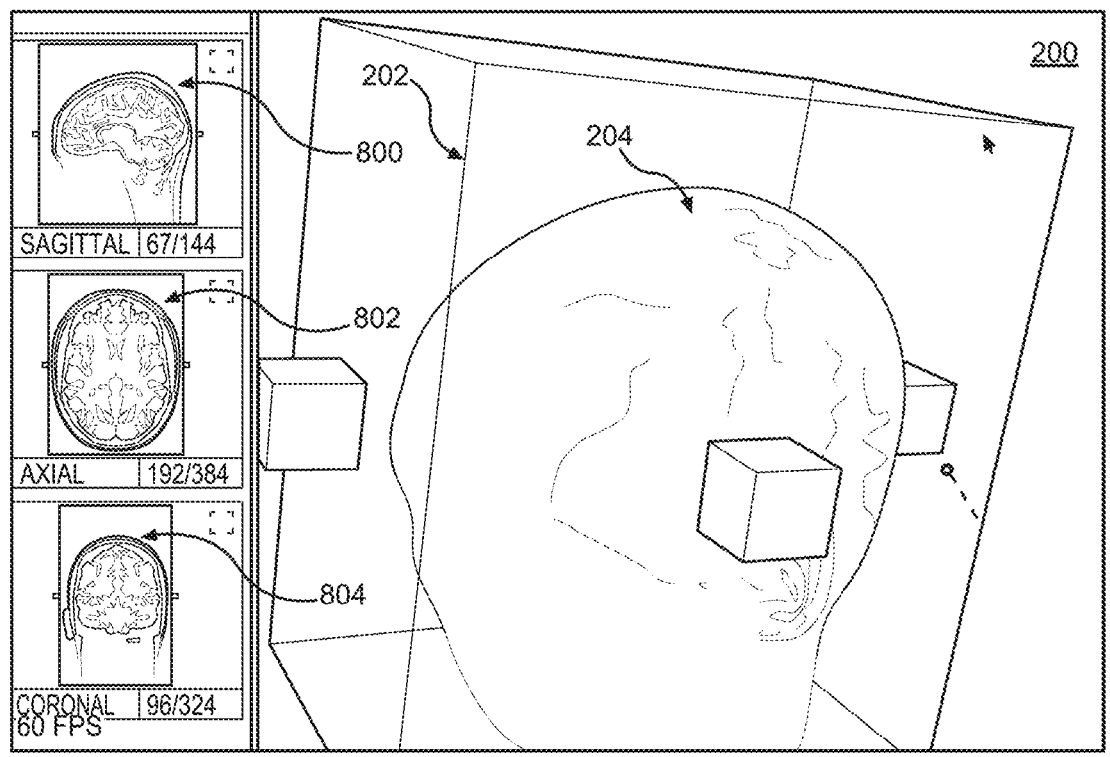
FIGS. 8A, 8B, 8C, 8D and 8E are each a diagram illustrating an exemplary environment in which some embodiments may operate.

As shown in FIG. 8A, the Interaction Engine may provide functionality for a slice-scroll bar virtual interaction. According to various embodiments the 3D medical model data may be represented according to different two-dimensional (2D) perspective views. For example, the 3D model data may be represented in a separate 2D interface via a sagittal 2D view 800, an axial 2D view 802 and a coronal 2D view 804. Each 2D view 800, 802, 804 may represent 3D medical model data according to a plurality of slice layers of model data. For example, sagittal 2D view 800 2D view may have 144 slice layers of model data, the axial 2D view 802 may have 384 slice layers of model data and the coronal 2D view 804 may have 324 slice layers of model data.

Figure 8B:
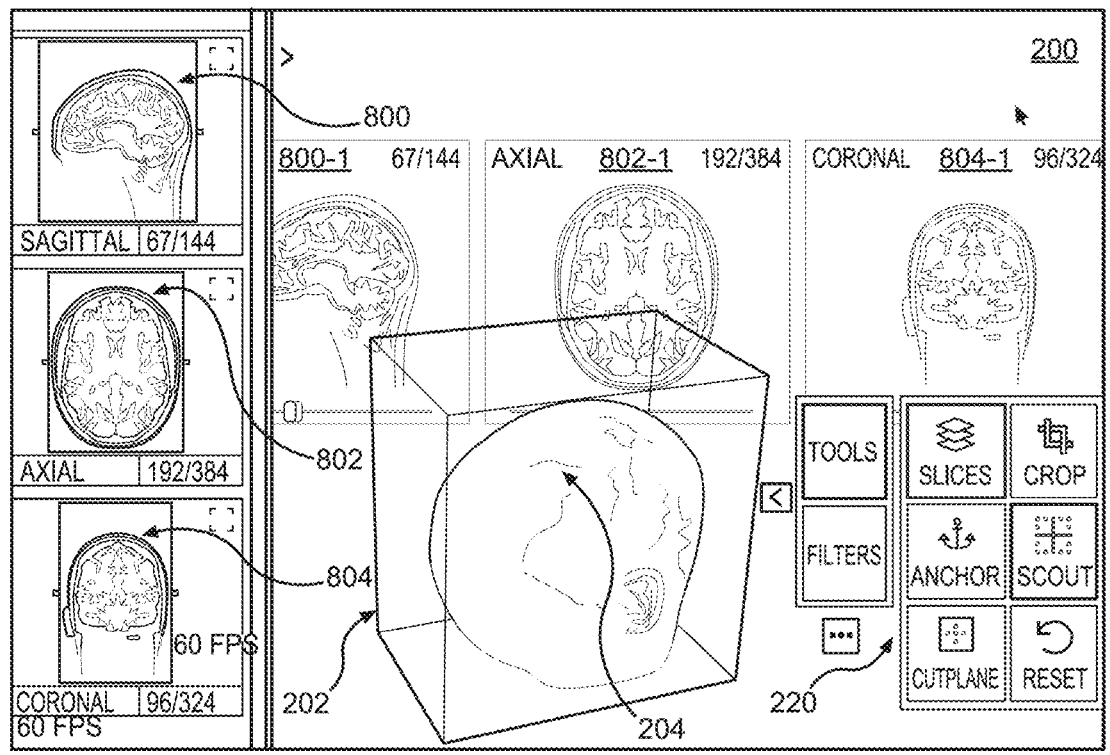
Figure 8C:
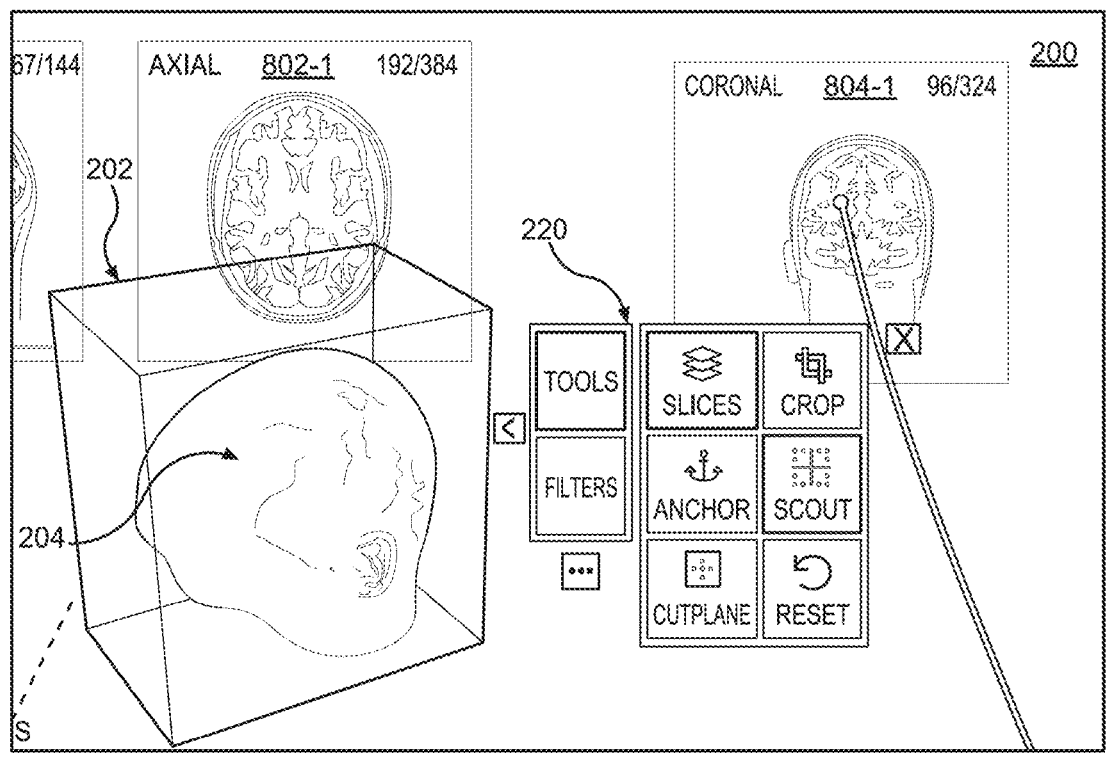

As shown in FIG. 8B, each 2D view 800, 802, 804 may have a corresponding version 800-1, 802-1, 804-1 displayed within the AR display 200. In addition, as shown in FIG. 8C, any of the versions 800-1, 802-1, 804-1 may be selected and subsequent detected movements of the user may correspond to virtual interactions that change a current display position of a selected version 804-1 in the AR display 200.

Figure 8D:
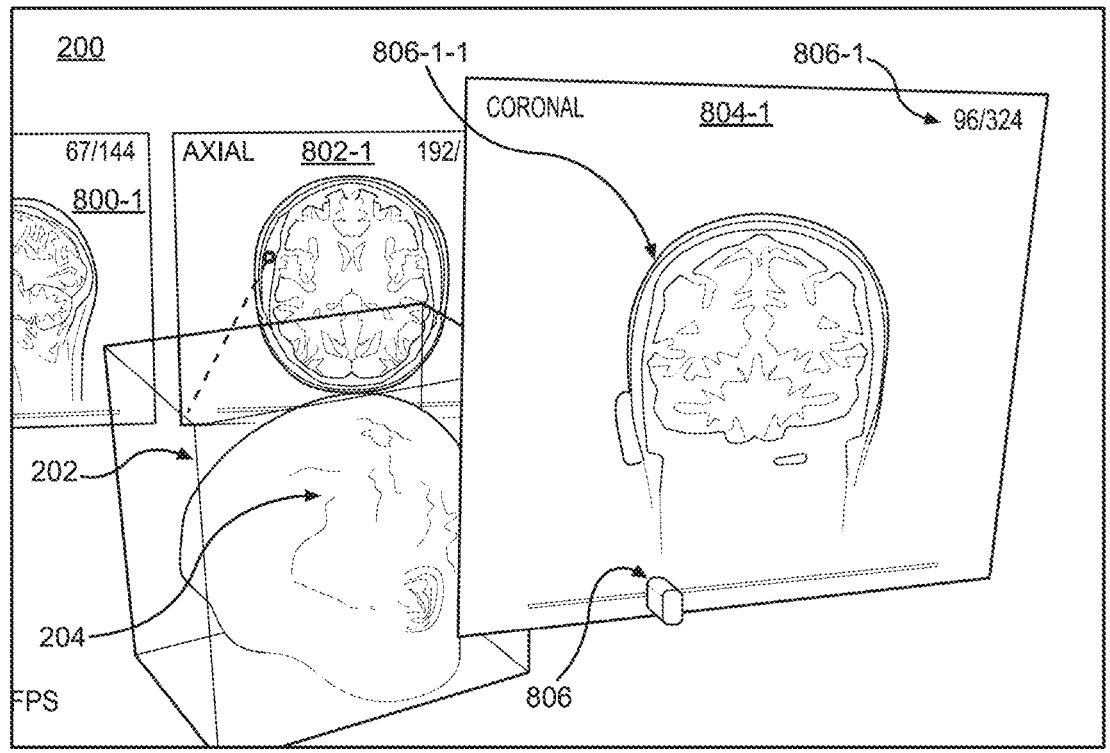

As shown in FIG. 8D, a selected version 804-1 may include a scroll-bar 806. A current display position of the scroll-bar 806 within the selected version 804-1 may correspond to a specific slice layer 806-1 of the medical model data. The Interaction Engine generates a 2D graphic representation 806-1-1 of the medical model data that corresponds to the specific slice layer 806-1 and displays the graphic representation 806-1-1 in the selected version 804-1 in the AR display 200.

Figure 8E:
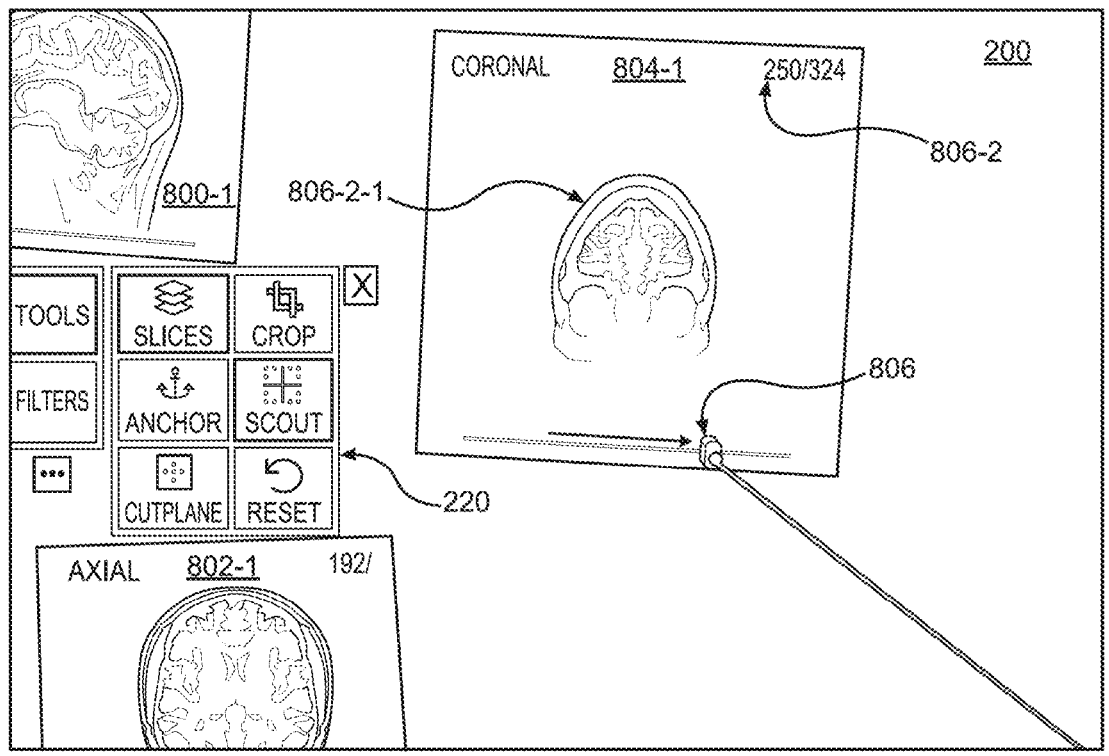

As shown in FIG. 8E, subsequent detected movements may correspond to one or more virtual interactions for selection and movement of the scroll-bar 806 such that the Interaction Engine updates a display position of the scroll-bar 806. The updated display position of the scroll-bar 806 thereby corresponds to a different slice layer 806-2 of the medical model data. The Interaction Engine identifies medical model data for the different slice layer 806-2 and generates a 2D graphic representation 806-2-1 of the identified medical model data that corresponds to the different slice layer 806-2. The Interaction Engine updates display of the version 804-1 with the 2D graphic representation 806-2-1.

Figure 9A:
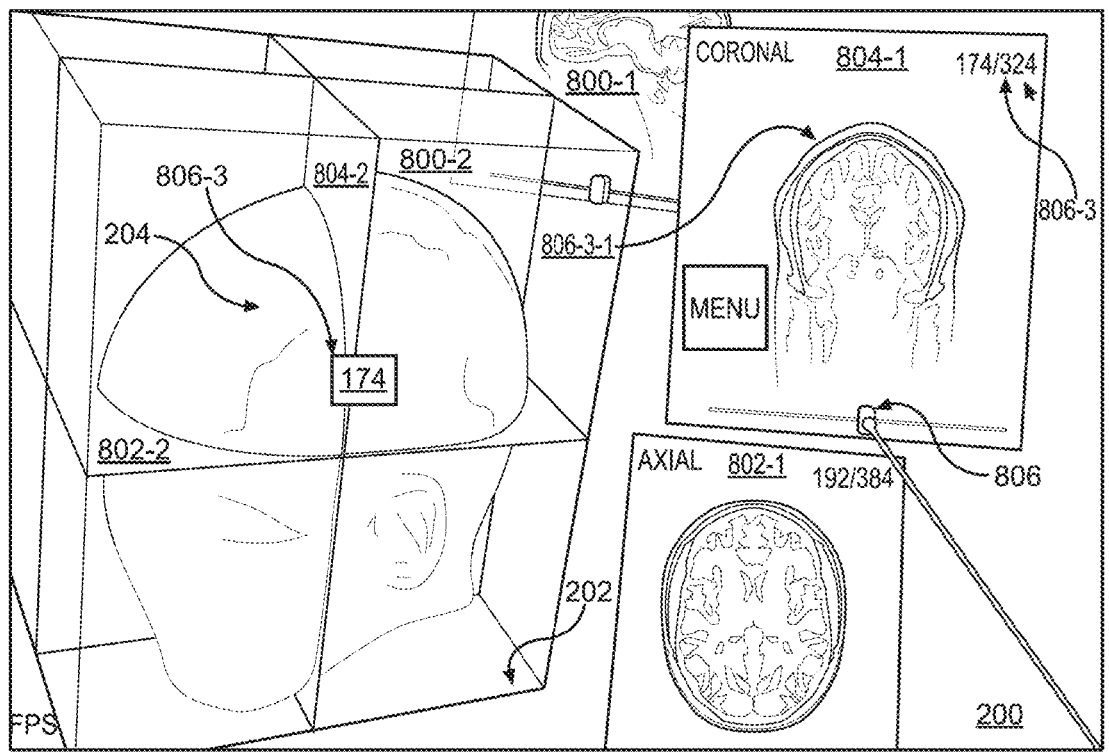
FIGS. 9A and 9B are each a diagram illustrating an exemplary environment in which some embodiments may operate.

As shown in FIG. 9A, the Interaction Engine may provide functionality for a scout virtual interaction. In various embodiments, the scout virtual interaction may be integrated into a AR display 200 based on functionality for the slice-scroll bar virtual interaction. The AR display 200 may further include display of the virtual container 202 and the 3D virtual medical model 204. The Interaction Engine may include display of scout planes 800-2, 802-2, 804-2 within the virtual container 202. A first scout plane 800-2 corresponds to a version of the sagittal 2D view 800-1. A second scout plane 802-2 corresponds to a version of the axial 2D view 802-1. A third scout plane 804-2 corresponds to a version of the coronal 2D view 804-1.

According to various embodiments, a current display position of each scout plane 800-2, 802-2, 804-2 corresponds to a specific slice layer of medical model data currently displayed by the respective sagittal, axial and coronal 2D versions 800-1, 802-1, 804-1 in the AR display 200. For example, a current display position of both a scroll-bar 806 displayed in the version of the coronal 2D view 804—and a coronal scout plane 804-2 maps to a specific slice layer 806-3 (slice layer 174/324) of medical model data. The Interaction Engine further displays a 2D graphic representation 806-3-1 of slice layer 174 in the version of the coronal 2D view 804-1.

Figure 9B:
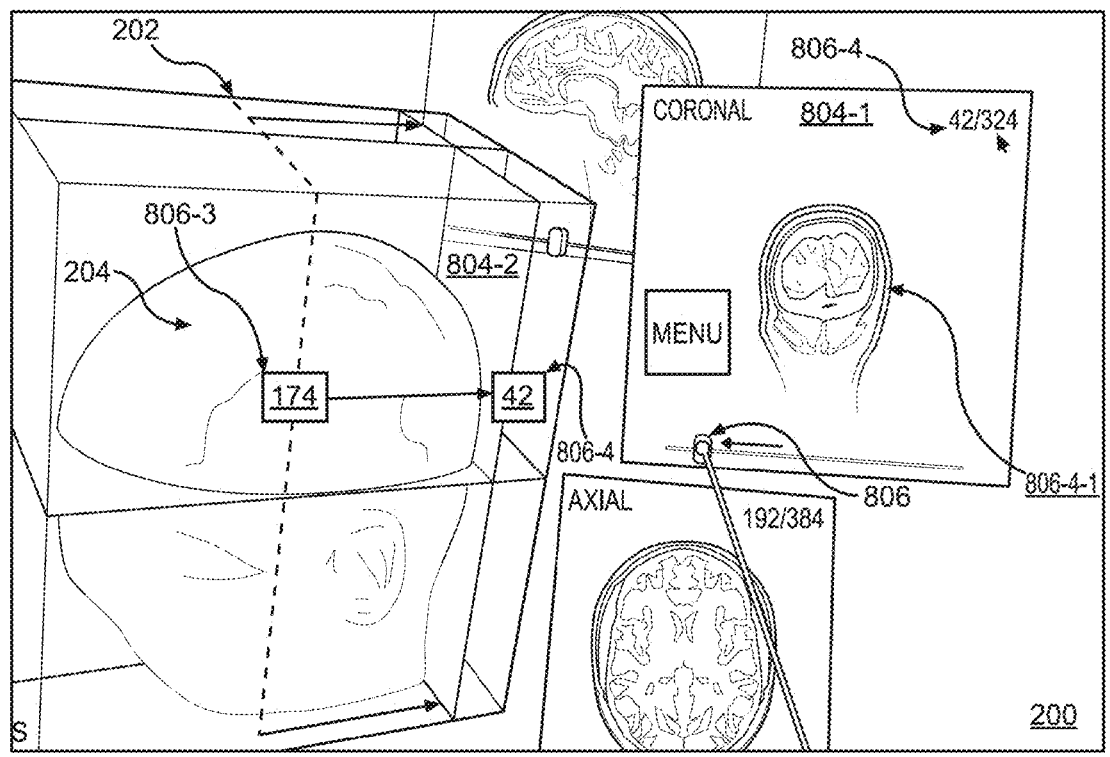

As shown in FIG. 9B, the Interaction Engine may detect physical movements that correspond to virtual interactions for selection of the scroll-bar 806 and renders movement of the scroll-bar 806 to an updated display position. The updated display position of the scroll-bar 806 thereby corresponds to a different slice layer 806-4 (slice layer 42/324). The Interaction Engine identifies medical model data for the different slice layer 806-4 and displays a 2D graphic representation 806-4-1 of the identified medical model data for slice layer 42 in the version of the coronal 2D view 804-1. The Interaction Engine further changes a display position of the coronal scout plane 804-2 within the virtual container 202 to an updated display position that corresponds to the different slice layer 806-4 (slice layer 42/324).

Figure 10:
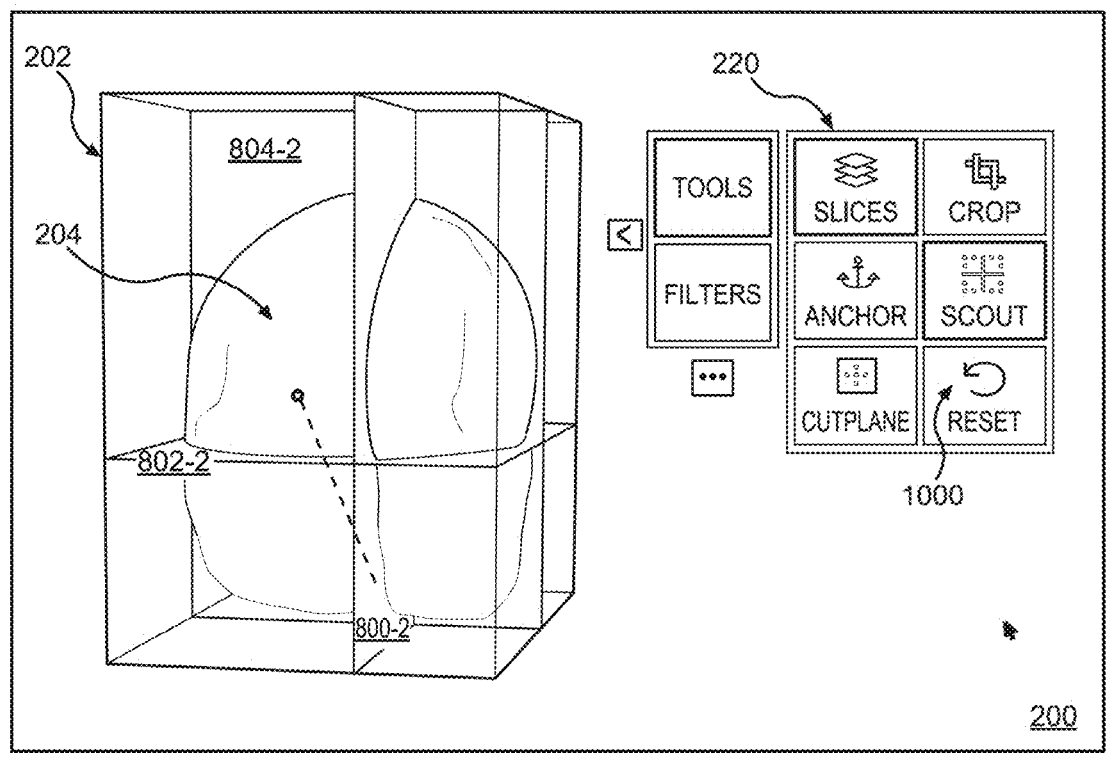
FIG. 10 is a diagram illustrating an exemplary environment in which some embodiments may operate.

As shown in FIG. 10, the Interaction Engine may provide functionality for a reset virtual interaction. According to various embodiments, the Interaction Engine may detect physical movements that correspond to virtual interactions for selection of reset functionality 1000. Upon detection of the selected reset functionality 1000, the Interaction Engine accesses a recorded model pose. For example, a recorded model pose may be an initial pose (i.e. position and orientation) of the 3D virtual medical model 204 in the virtual container 202. In another example, a recorded model pose may be a pose of the 3D virtual medical model 204 in the virtual container 202 at a particular time. Upon accessing the recorded model pose, the Interaction Engine repositions the 3D virtual medical model 204 displayed in the AR display 200 according to the accessed model pose in order to reset the medical model 204's pose within the virtual container 202.

According to various embodiments, the user may select the reset functionality 1000 during implementation of the scout functionality such that the 3D virtual medical model 204 resets to a display position to portray the recorded model pose, or initial pose, while the respective scout planes 800-2, 802-2, 804-2 maintain their current positions that correspond to slice layers of the medical model data. In various embodiments, the user may select the reset functionality during implementation of any other functionality of the Interaction Engine.

Figure 11A:
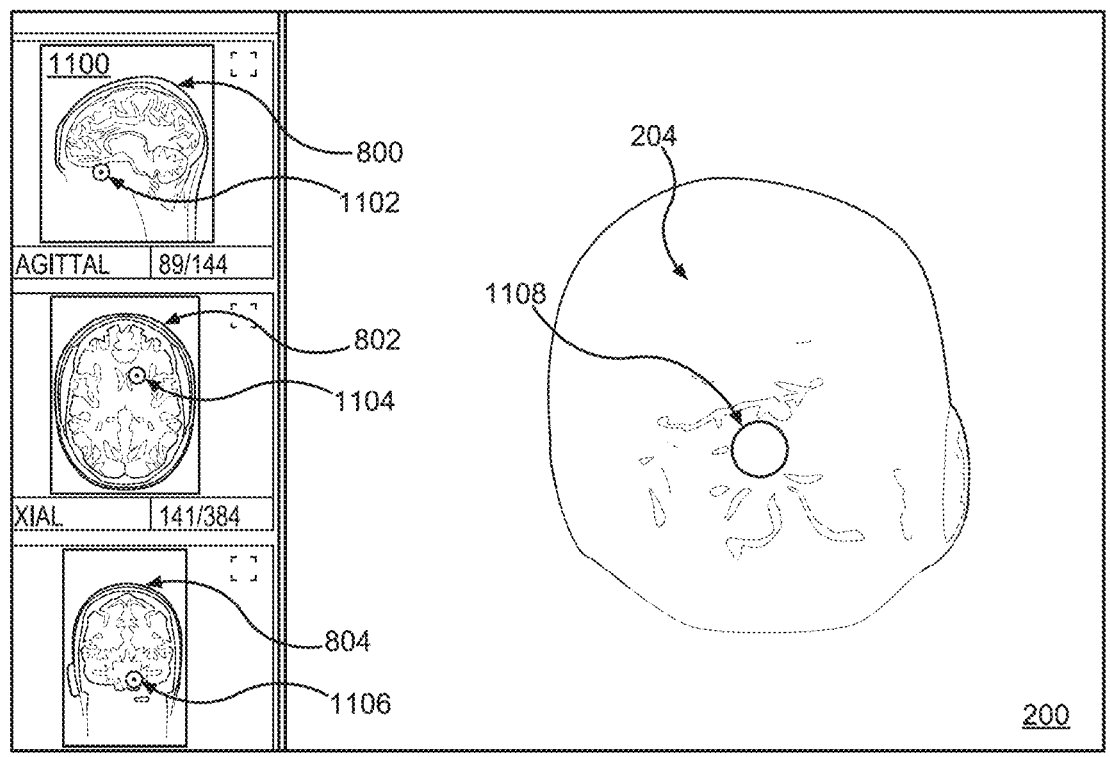
FIGS. 11A and 11B are each a diagram illustrating an exemplary environment in which some embodiments may operate.

As shown in FIG. 11A, the Interaction Engine may provide functionality for an annotation virtual interaction. According to various embodiments, a user may access a 2D interface 1100 that displays the sagittal 2D view 800, the axial 2D view 802 and the coronal 2D view 804. It is understood that the 2D interface 1100 may be displayed on a separate computing device(s) that is in communication with an AR headset device worn by the user or another user. In various embodiments, the separate computing device may implement one or more modules of the Interaction Engine such that the separate computing device executes its own Interaction Engine instance.

According to various embodiments, the user may select a 2D virtual landmark 1102 in the sagittal 2D view 800. The Interaction Engine identifies medical model data for the axial 2D view 802 and the coronal 2D view 804 that corresponds with a placement of the 2D virtual landmark 1102. Based on the identified medical model data, the Interaction Engine generates additional 2D virtual landmarks 1104, 1106 for concurrent display within the axial and coronal 2D views 802, 804.

The Interaction Engine instance running at the AR headset device generates a 3D virtual landmark 1108 based on the identified medical model data for the 2D virtual landmarks 1102, 1104, 1106. The Interaction Engine instance displays a 3D virtual landmark 1108 at a display position within the 3D virtual medical model 204 with respect to its current model pose. The display position of the 3D virtual landmark 1108 corresponds to the display positions of the 2D virtual landmarks 1102, 1104, 1106. In various embodiments, the Interaction Engine may update the display positions of any of the 2D virtual landmarks 1102, 1104, 1106 and/or 3D virtual landmark 1108 in response to receipt of direction data that corresponds to one or more physical gestures performed by the user. In some embodiments, the Interaction Engine may modify a display position of a particular virtual landmark in response to receipt of data from a physical instrument manipulated by the user. For example, the physical instrument may be a localizing instrument. It is understood that various embodiments may not be limited to any number of displayed virtual landmarks. For example, there may be any number of displayed 2D virtual landmarks and/or any number of displayed 3D virtual landmarks. A plurality of displayed virtual landmarks may be visually distinct from each other. For example, each displayed virtual landmark may differ in color and/or shape.

Figure 11B:
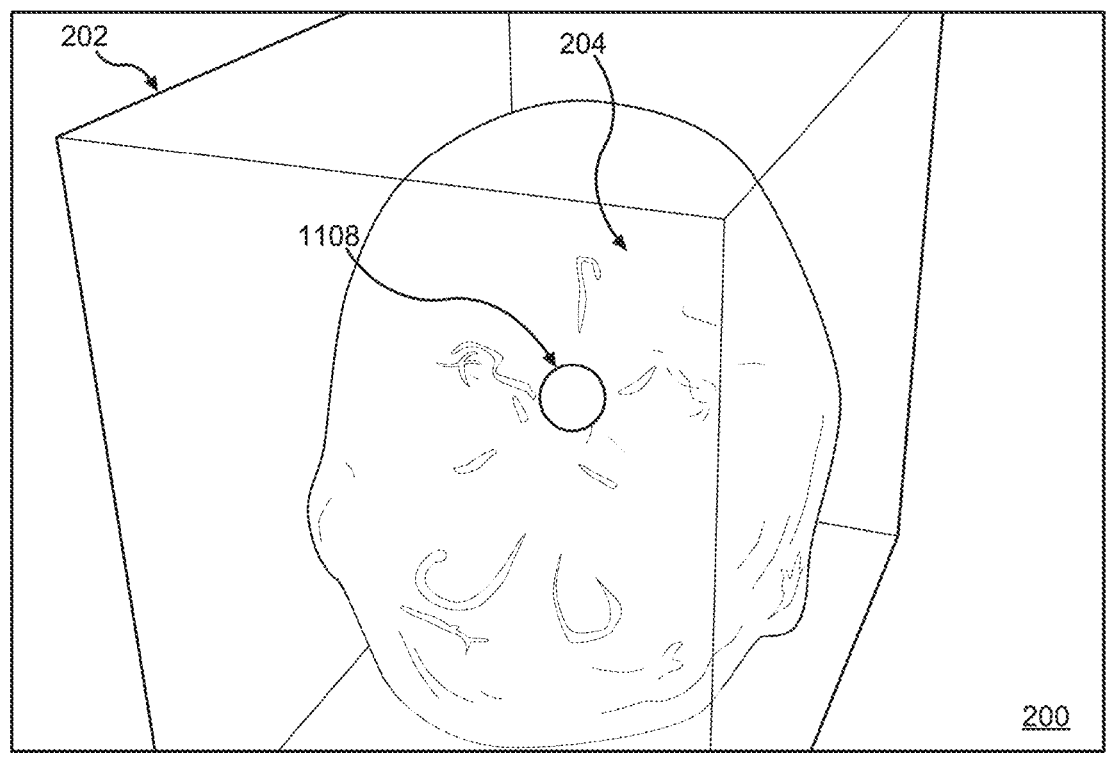

As shown in FIG. 11B, the Interaction Engine instance running at the AR headset device may detect subsequent physical movements during implementation of the functionality for the annotation virtual interaction. The detected physical movements may correspond to various types of virtual interactions. For example, one or more detected physical movements may correspond to a virtual interaction(s) for rotation of the virtual container 202. According to various embodiments, rendering and display of the rotation of the virtual container 202 in the AR display 200 may further result in rendering and display of a rotation of the 3D virtual medical model 204 at the currently displayed model pose.

According to various embodiments, the Interaction Engine may provide functionality for a tuning virtual interaction(s). For example, a tuning virtual interaction may adjust one or more rendering parameters utilized by the Interaction Engine to generate display of the virtual container 202 and/or the 3D virtual medical model 204 as well as any other graphic rendered during any type of virtual interaction. For example, a tuning virtual interaction(s) may adjust an opacity parameter, a brightness parameter, and/or a color parameter. According to various embodiments, the Interaction Engine may detect a tuning virtual interaction and may access one or more voxel values for visualization of the 3D virtual medical model 204 (i.e. volumetric rendering). The Interaction Engine applies a parameter change represented by the detected tuning virtual interaction to a rendering of the one or more voxel values.

Figure 12:
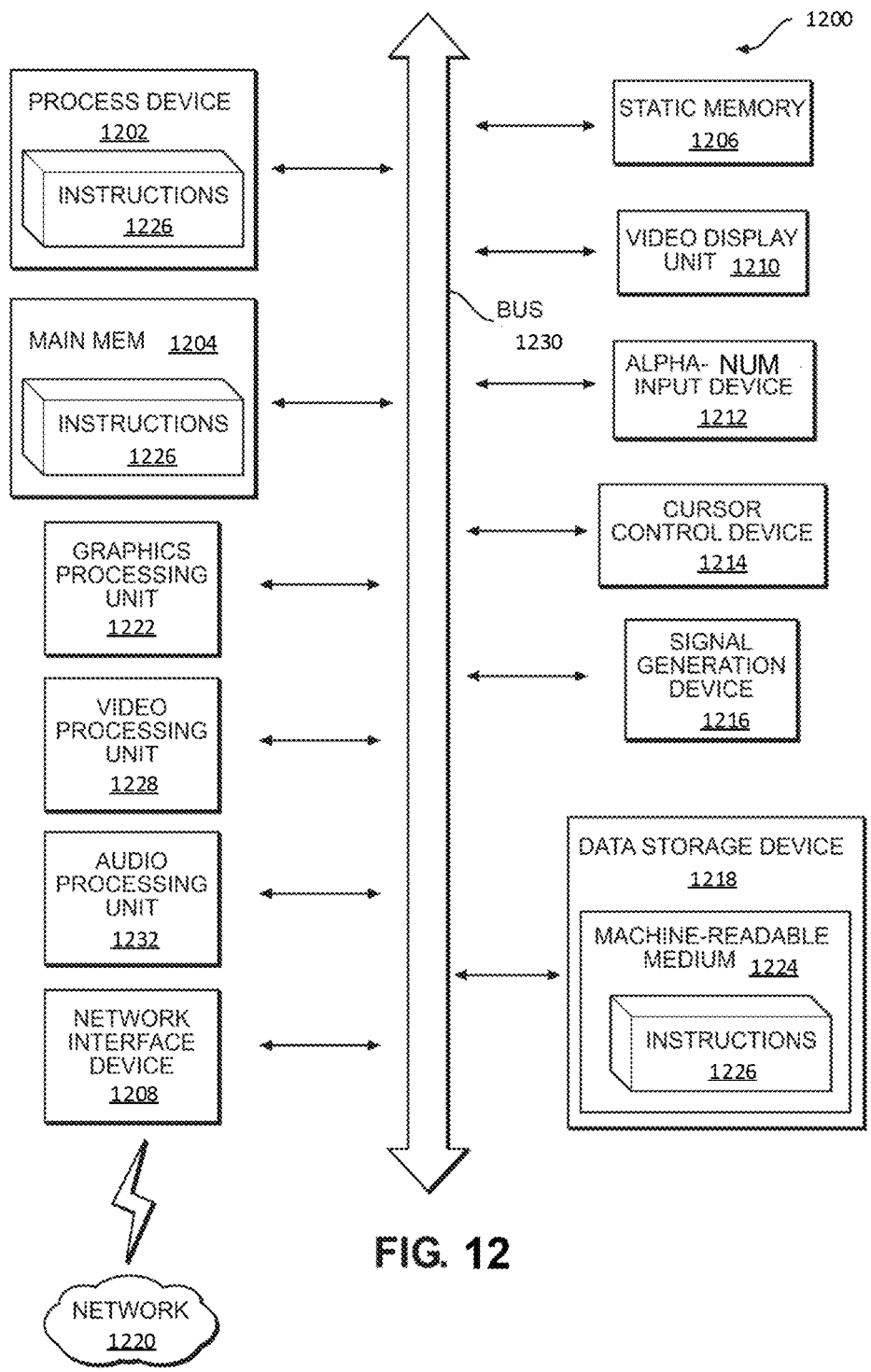
FIG. 12 is a diagram illustrating an exemplary environment in which some embodiments may operate.

FIG. 12 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a computer-readable medium) on which is stored one or more sets of instructions or software 1226 embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In one implementation, the instructions 1226 include instructions to implement functionality corresponding to the components of a device to perform the disclosure herein. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
generating, within a unified three-dimensional (3D) coordinate space:
(i) a virtual 3D medical model positioned according to a current model pose, the current model pose representing a position and orientation of the virtual 3D medical model in the unified 3D coordinate space; and
(ii) at least one a virtual 3D hand representation;
rendering, via an Augmented Reality (AR) headset device, an AR display that includes display of the virtual 3D medical model positioned according to the current model pose and the virtual 3D hand representation;
detecting a first physical gesture;
modifying the AR display, via the AR headset device, by rendering display of a type of movement of the virtual 3D hand representation based on the detected first physical gesture;
identifying selection of a clipping plane virtual interaction based on the type of movement of the virtual 3D hand representation;
modifying the AR display, via the AR headset device, by rendering a virtual clipping plane in the AR display concurrently displayed, at a first display position, with the virtual 3D medical model;
detecting a second physical gesture based on a first change of pose data of the AR headset device, the first change of pose data representing a change of a position and orientation of the AR headset device in the unified 3D coordinate space;
determining a second display position of the virtual clipping plane based on the first change of pose data of the AR headset device;
determining a first intersection between the virtual 3D clipping plane at the second display position and the rendered virtual 3D medical model at the current model pose; and
identifying one or more portions of non-rendered 3D medical model data for the virtual 3D medical model in the current model pose that map to the first intersection; and modifying the AR display, via the AR headset device, by rendering the virtual clipping plane at the second display position concurrently with rendering the virtual 3D medical model portraying the identified one or more portions of 3D medical model data that map to the first intersection.

2. The computer-implemented method of claim 1, rendering, via an Augmented Reality (AR) headset device, an AR display that includes display of the virtual 3D medical mode positioned according to the model pose and a virtual 3D hand representation further comprises:
rendering a virtual 3D model container; and
rendering the virtual 3D medical model positioned according to the model pose within a display of the rendered virtual 3D model container.

3. The computer-implemented method of claim 2, wherein identifying one or more portions of non-rendered 3D medical model data for the virtual 3D medical model in the current model pose that map to the first intersection comprises:
identifying an overlap between one or more coordinates within the virtual 3D model container and one or more portions of the virtual 3D clipping plane bounded within the first intersection;
identifying one or more portions of non-rendered 3D medical model data that map to the identified one or more coordinates within the virtual 3D model container.

4. The computer-implemented method of claim 3, further comprising:
prior to modifying the AR display by rendering the virtual clipping plane at the second display position:
updating the virtual 3D medical model according to the identified one or more portions of 3D medical model data that map to the identified one or more coordinates within the virtual 3D model container.

5. The computer-implemented method of claim 4, further comprising:
detecting a third physical gesture based on a subsequent second change of pose data of the AR headset device, the subsequent second change of pose data representing a change of a position and orientation of the AR headset device in the unified 3D coordinate space;
determining a third display position of the virtual clipping plane based on the subsequent change of pose data of the AR headset device;
determining a second intersection between the virtual 3D clipping plane at the third display position and the rendered updated virtual 3D medical model at the current model pose.

6. The computer-implemented method of claim 5, further comprising:
identifying one or more portions of non-rendered 3D medical model data for the updated virtual 3D medical model in the current model pose that map to the second intersection; and
modifying the AR display, via the AR headset device, by rendering the virtual clipping plane at the third display position concurrently with rendering of a second updated virtual 3D medical model portraying the identified one or more portions of 3D medical model data that map to the second intersection.

7. The computer-implemented method of claim 6, further comprising:
wherein rendering the virtual 3D medical model portraying the identified one or more portions of 3D medical model data that map to the first intersection comprises: rendering the virtual 3D medical model within the virtual 3D container; and wherein rendering the second updated virtual 3D medical model portraying the identified one or more portions of 3D medical model data that map to the second intersection comprises: rendering the second updated virtual 3D medical model within the virtual 3D container.

8. A system comprising one or more processors, and a non-transitory computer-readable medium including one or more sequences of instructions that, when executed by the one or more processors, cause the system to perform operations comprising:
generating, within a unified three-dimensional (3D) coordinate space:
(i) a virtual 3D medical model positioned according to a current model pose, the current model pose representing a position and orientation of the virtual 3D medical model in the unified 3D coordinate space; and
(ii) at least one a virtual 3D hand representation;
rendering, via an Augmented Reality (AR) headset device, an AR display that includes display of the virtual 3D medical model positioned according to the current model pose and the virtual 3D hand representation;
detecting a first physical gesture;
modifying the AR display, via the AR headset device, by rendering display of a type of movement of the virtual 3D hand representation based on the detected first physical gesture;
identifying selection of a clipping plane virtual interaction based on the type of movement of the virtual 3D hand representation;
modifying the AR display, via the AR headset device, by rendering a virtual clipping plane in the AR display concurrently displayed, at a first display position, with the virtual 3D medical model;
detecting a second physical gesture based on a first change of pose data of the AR headset device, the first change of pose data representing a change of a position and orientation of the AR headset device in the unified 3D coordinate space;
determining a second display position of the virtual clipping plane based on the first change of pose data of the AR headset device;
determining a first intersection between the virtual 3D clipping plane at the second display position and the rendered virtual 3D medical model at the current model pose; and
identifying one or more portions of non-rendered 3D medical model data for the virtual 3D medical model in the current model pose that map to the first intersection; and
modifying the AR display, via the AR headset device, by rendering the virtual clipping plane at the second display position concurrently with rendering the virtual 3D medical model portraying the identified one or more portions of 3D medical model data that map to the first intersection.

9. The system of claim 8, rendering, via an Augmented Reality (AR) headset device, an AR display that includes display of the virtual 3D medical mode positioned according to the model pose and a virtual 3D hand representation further comprises:
rendering a virtual 3D model container; and
rendering the virtual 3D medical model positioned according to the model pose within a display of the rendered virtual 3D model container.

10. The system of claim 9, wherein identifying one or more portions of non-rendered 3D medical model data for the virtual 3D medical model in the current model pose that map to the first intersection comprises:
- identifying an overlap between one or more coordinates within the virtual 3D model container and one or more portions of the virtual 3D clipping plane bounded within the first intersection;
- identifying one or more portions of non-rendered 3D medical model data that map to the identified one or more coordinates within the virtual 3D model container.

11. The system of claim 10, further comprising:
prior to modifying the AR display by rendering the virtual clipping plane at the second display position:
- updating the virtual 3D medical model according to the identified one or more portions of 3D medical model data that map to the identified one or more coordinates within the virtual 3D model container.

12. The system of claim 11, further comprising:
- detecting a third physical gesture based on a subsequent second change of pose data of the AR headset device, the subsequent second change of pose data representing a change of a position and orientation of the AR headset device in the unified 3D coordinate space;
- determining a third display position of the virtual clipping plane based on the subsequent change of pose data of the AR headset device;
- determining a second intersection between the virtual 3D clipping plane at the third display position and the rendered updated virtual 3D medical model at the current model pose.

13. The system of claim 12, further comprising:
- identifying one or more portions of non-rendered 3D medical model data for the updated virtual 3D medical model in the current model pose that map to the second intersection; and
- modifying the AR display, via the AR headset device, by rendering the virtual clipping plane at the third display position concurrently with rendering of a second updated virtual 3D medical model portraying the identified one or more portions of 3D medical model data that map to the second intersection.

14. The system of claim 13, further comprising:
- wherein rendering the virtual 3D medical model portraying the identified one or more portions of 3D medical model data that map to the first intersection comprises: rendering the virtual 3D medical model within the virtual 3D container; and
- wherein rendering the second updated virtual 3D medical model portraying the identified one or more portions of 3D medical model data that map to the second intersection comprises: rendering the second updated virtual 3D medical model within the virtual 3D container.

15. A computer program product comprising a non-transitory computer-readable medium having a computer-readable program code embodied therein to be executed by one or more processors, the program code including instructions to:
generating, within a unified three-dimensional (3D) coordinate space:
  (i) a virtual 3D medical model positioned according to a current model pose, the current model pose representing a position and orientation of the virtual 3D medical model in the unified 3D coordinate space; and
  (ii) at least one a virtual 3D hand representation;
rendering, via an Augmented Reality (AR) headset device, an AR display that includes display of the virtual 3D medical model positioned according to the current model pose and the virtual 3D hand representation;
detecting a first physical gesture;
modifying the AR display, via the AR headset device, by rendering display of a type of movement of the virtual 3D hand representation based on the detected first physical gesture;
identifying selection of a clipping plane virtual interaction based on the type of movement of the virtual 3D hand representation;
modifying the AR display, via the AR headset device, by rendering a virtual clipping plane in the AR display concurrently displayed, at a first display position, with the virtual 3D medical model;
detecting a second physical gesture based on a first change of pose data of the AR headset device, the first change of pose data representing a change of a position and orientation of the AR headset device in the unified 3D coordinate space;
determining a second display position of the virtual clipping plane based on the first change of pose data of the AR headset device;
determining a first intersection between the virtual 3D clipping plane at the second display position and the rendered virtual 3D medical model at the current model pose; and
identifying one or more portions of non-rendered 3D medical model data for the virtual 3D medical model in the current model pose that map to the first intersection; and
modifying the AR display, via the AR headset device, by rendering the virtual clipping plane at the second display position concurrently with rendering the virtual 3D medical model portraying the identified one or more portions of 3D medical model data that map to the first intersection.

16. The computer program product of claim 15, rendering, via an Augmented Reality (AR) headset device, an AR display that includes display of the virtual 3D medical mode positioned according to the model pose and a virtual 3D hand representation further comprises:
- rendering a virtual 3D model container; and
- rendering the virtual 3D medical model positioned according to the model pose within a display of the rendered virtual 3D model container.

17. The computer program product of claim 16, wherein identifying one or more portions of non-rendered 3D medical model data for the virtual 3D medical model in the current model pose that map to the first intersection comprises:
- identifying an overlap between one or more coordinates within the virtual 3D model container and one or more portions of the virtual 3D clipping plane bounded within the first intersection;
- identifying one or more portions of non-rendered 3D medical model data that map to the identified one or more coordinates within the virtual 3D model container.

18. The computer program product of claim 17, further comprising:
prior to modifying the AR display by rendering the virtual clipping plane at the second display position:
- updating the virtual 3D medical model according to the identified one or more portions of 3D medical model data that map to the identified one or more coordinates within the virtual 3D model container.

19. The computer program product of claim 18, further comprising:
    detecting a third physical gesture based on a subsequent second change of pose data of the AR headset device, the subsequent second change of pose data representing a change of a position and orientation of the AR headset device in the unified 3D coordinate space;
    determining a third display position of the virtual clipping plane based on the subsequent change of pose data of the AR headset device;
    determining a second intersection between the virtual 3D clipping plane at the third display position and the rendered updated virtual 3D medical model at the current model pose;
    identifying one or more portions of non-rendered 3D medical model data for the updated virtual 3D medical model in the current model pose that map to the second intersection; and
    modifying the AR display, via the AR headset device, by rendering the virtual clipping plane at the third display position concurrently with rendering of a second updated virtual 3D medical model portraying the identified one or more portions of 3D medical model data that map to the second intersection.

20. A computer-implemented method, comprising:
    generating, within a unified three-dimensional (3D) coordinate space:
    (i) a virtual 3D container;
    (ii) a virtual 3D medical model positioned according to a current model pose within the virtual 3D container, the current model pose representing a position and orientation of the virtual 3D medical model in the unified 3D coordinate space; and
    (iii) at least one a virtual 3D hand representation;
    rendering, via an Augmented Reality (AR) headset device, an AR display that includes display of the virtual 3D container and virtual 3D medical model positioned according to the current model pose and the virtual 3D hand representation;
    detecting a first physical gesture;
    modifying the AR display, via the AR headset device, by rendering display of a type of movement of the virtual 3D hand representation based on the detected first physical gesture;
    identifying selection of a cropping virtual interaction based on the type of movement of the virtual 3D hand representation;
    modifying the AR display, via the AR headset device, by rendering a selectable shape in the AR display concurrently displayed on a first surface of the virtual 3D container, the first surface displayed at a first display position;
    detecting a second physical gesture based on a first change of pose data of the AR headset device, the first change of pose data representing a change of a position and orientation of the AR headset device in the unified 3D coordinate space;
    determining a movement of the selectable shape on the first surface of the virtual 3D container based on the first change of pose data of the AR headset device;
    determining a second display position of the first surface of the virtual 3D container resulting from the movement of the selectable shape;
    determining a first intersection between the first surface of the virtual 3D container at the second display position and the rendered virtual 3D medical model at the current model pose; and
    identifying one or more portions of non-rendered 3D medical model data for the virtual 3D medical model in the current model pose that map to the first intersection; and
    modifying the AR display, via the AR headset device, by rendering the first surface of the virtual 3D container at the second display position concurrently with rendering the virtual 3D medical model portraying the identified one or more portions of 3D medical model data that map to the first intersection.

* * * * *